(12) United States Patent
Kim

(10) Patent No.: US 10,594,894 B2
(45) Date of Patent: Mar. 17, 2020

(54) IMAGE ACQUISITION APPARATUS, IMAGE FORMING APPARATUS AND METHOD FOR CONTROLLING THE SAME

(71) Applicant: HP PRINTING KOREA CO., LTD., Suwon-si, Gyeonggi-Do (KR)

(72) Inventor: Kyung Rok Kim, Seongnam (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 228 days.

(21) Appl. No.: 15/205,713

(22) Filed: Jul. 8, 2016

(65) Prior Publication Data

US 2017/0187919 A1 Jun. 29, 2017

(30) Foreign Application Priority Data

Dec. 24, 2015 (KR) .......................... 10-2015-0186714

(51) Int. Cl.
| | |
|---|---|
| H04N 1/393 | (2006.01) |
| H04N 9/04 | (2006.01) |
| H04N 1/48 | (2006.01) |
| H04N 5/349 | (2011.01) |
| H04N 1/04 | (2006.01) |
| H04N 1/195 | (2006.01) |
| H04N 1/387 | (2006.01) |

(52) U.S. Cl.
CPC ......... *H04N 1/3935* (2013.01); *H04N 1/0443* (2013.01); *H04N 1/195* (2013.01); *H04N 1/3876* (2013.01); *H04N 1/486* (2013.01); *H04N 5/349* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 4,876,612 A | 10/1989 | Honma et al. | |
| 5,177,626 A * | 1/1993 | Nosaki | H04N 1/0402 358/409 |
| 5,181,104 A * | 1/1993 | Sugishima | H04N 1/047 358/453 |
| 5,877,807 A | 3/1999 | Lenz | |
| 6,005,680 A * | 12/1999 | Luther | H04N 1/40062 358/2.1 |

(Continued)

OTHER PUBLICATIONS

Extended European Search Report dated Apr. 28, 2017 in corresponding European Patent Application No. 16 17 7250.

*Primary Examiner* — Kevin Ky
(74) *Attorney, Agent, or Firm* — Staas & Halsey LLP

(57) ABSTRACT

An image acquisition apparatus, an image forming apparatus, and a control method of the same are provided. An image acquisition apparatus includes an image sensor in which a red element outputting a signal corresponding to a red light, a green element outputting a signal corresponding to a green light, and a blue element outputting a signal corresponding to a blue light are arranged in a predetermined pattern, a driving unit configured to move the image sensor to a plurality of positions; and an image processor configured to receive a signal output from the red element, the green element and the blue element in the plurality of positions, respectively, and configured to acquire an image of an object by combining the received signal.

14 Claims, 33 Drawing Sheets

(56) References Cited

U.S. PATENT DOCUMENTS

| | | | |
|---|---|---|---|
| 6,583,895 B1* | 6/2003 | Kuwahara | H04N 1/107 358/444 |
| 7,236,650 B1 | 6/2007 | Omori et al. | |
| 2003/0123002 A1* | 7/2003 | Kawase | G02F 1/133514 349/113 |
| 2012/0263395 A1 | 10/2012 | Sellers et al. | |
| 2013/0044334 A1* | 2/2013 | Igawa | G03G 15/607 356/635 |
| 2016/0366340 A1* | 12/2016 | Okamoto | H04N 5/23293 |

* cited by examiner $G_O/G_T=50\%$

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

$B_O/B_T = 25\%$

IMAGE ACQUISITION APPARATUS, IMAGE FORMING APPARATUS AND METHOD FOR CONTROLLING THE SAME

CROSS-REFERENCE TO RELATED APPLICATION

This application claims the priority benefit of Korean Patent Application No. 10-2015-0186714, filed on Dec. 24, 2015 in the Korean Intellectual Property Office, the disclosure of which is incorporated herein by reference.

BACKGROUND

1. Field

Embodiments of the present disclosure relate to an image acquisition apparatus, an image forming apparatus, and a control method of the same.

2. Description of the Related Art

Image acquisition apparatuses are apparatuses that read image information recorded on an object and acquires an image data corresponding to the image information. In addition the image acquisition apparatus store the acquired image data in the type of a file or displays the image data, or prints the image data on a printing medium to provide to a user. The image acquisition apparatuses include cameras, camcorders, and scanners. The scanner may be implemented in the form of multi-function peripheral (MFP) by being combined with a printer, a copying machine or a facsimile.

The scanner is an apparatus that obtains information related to an image described, illustrated or printed on a document, acquires an image corresponding to the information in the electronic form, and displays the acquired image to a user. The scanner is configured to radiate a light to an object and to image the object by using means, e.g. a camera, to receive an optical signal, thereby acquiring an image corresponding to the object.

The image acquisition apparatus represents an apparatus configured to print a certain image on a printing medium, e.g. printing paper. The imaging acquisition apparatus includes a printer, a printing machine, a facsimile or a multi-function peripheral (MFP) that is implemented by being combined with some function or every function of the printer, the printing machine and the facsimile.

SUMMARY

Therefore, it is an aspect of the present disclosure to provide an image acquisition apparatus and an image forming apparatus capable of acquiring a high-definition image of an object by scanning an object with high resolution, and a control method of the image acquisition apparatus.

It is another aspect of the present disclosure to provide an image acquisition apparatus and an image forming apparatus capable of improving degradation of image quality caused by reflection of a lighting when acquiring an image of an object, and a control method of the image acquisition apparatus.

Additional aspects of the present disclosure will be set forth in part in the description which follows and, in part, will be obvious from the description, or may be learned by practice of the present disclosure.

In accordance with an aspect of the present invention, an image acquisition apparatus comprises: an image sensor in which a red element outputting a signal corresponding to a red light, a green element outputting a signal corresponding to a green light, and a blue element outputting a signal corresponding to a blue light are arranged in a predetermined pattern; a driving unit configured to move the image sensor to a plurality of positions; and an image processor configured to receive a signal output from the red element, the green element and the blue element in the plurality of positions, respectively, and configured to acquire an image of an object by combining the received signal.

The driving unit moves the image sensor so that the red element is disposed to a position in which at least one of the green element and the blue element was previously disposed, the green element is disposed to a position in which at least one of the red element and the blue element was previously disposed, and the blue element is disposed to a position in which at least one of the red element and the green element was previously disposed.

The driving unit moves the image sensor so that at least one of the red element, the green element, and the blue element is disposed to a second position in which another element was previously disposed, after at least one of the red element, the green element, and the blue element outputs a first signal in a first position.

The driving unit moves the image sensor so that at least one of the red element, the green element, and the blue element is disposed to a third position in which another element was previously disposed, after at least one of the red element, the green element, and the blue element outputs a second signal in a second position.

The driving unit moves the image sensor so that at least one of the red element, the green element, and the blue element is disposed to a fourth position in which another element was previously disposed, after at least one of the red element, the green element, and the blue element outputs a third signal in a third position, wherein the at least one of the red element, the green element, and the blue element outputs a fourth signal in the fourth position.

The image processor combines the first signal, the second signal, the third signal and the fourth signal.

The image processor combines the first signal and the second signal when the first signal and the second signal are output from the green element.

The image processor acquires an image by combining the first signal to the fourth signal output from the red element, the first signal and the second signal output from the green element, and the first signal to the fourth signal output from the blue element.

The driving unit moves the image sensor to a direction perpendicular to a direction in which the image sensor faces the object.

The driving unit moves the image sensor to a plurality of directions, wherein at least two directions in the plurality of direction are perpendicular to each other The predetermined pattern comprises a mosaic pattern.

In accordance with another aspect of the present invention, an image acquisition apparatus comprises: a first light source; a second light source configured to not radiate a light when the first light source radiates a light and configured to radiate a light when the first light source does not radiate a light; an image sensor configured to receive a light that is radiated from the first light source or the second light source and then reflected from an object, and configured to output a signal corresponding to the received light; and an image processor configured to generate an image by combining a signal corresponding to a light that is radiated from the first light source and then reflected by an object and a signal corresponding to a light that is radiated from the second light source and then reflected by an object.

The image sensor acquires an image signal about a first portion that is one portion of an object when a light is radiated from the first light source, and an image signal about a second portion that is another portion of an object when a light is radiated from the second light source.

The first light source and the second light source are disposed to be opposite to each other with respect to the image sensor.

The first portion comprises a portion of an object in a direction in which the second light source is disposed, and the second portion comprises a portion of an object in a direction in which the first light source is disposed.

The image sensor selectively acquires a signal about a first portion of an image that is acquired when a light is radiated from the first light source, and may selectively acquires a signal about a second portion of an image that is acquired when a light is radiated from the second light source.

The first light source and the second light source are turned on in order.

In accordance with another aspect of the present invention, a control method of an image acquisition apparatus comprises: acquiring a first image signal of an object by at least one element of an image sensor in a first position; disposing the at least one element to a second position in which another element of at least one element was previously disposed, by moving the at least one element; acquiring a second image signal of the object by at least one element in a second position; and acquiring an image of the object by combining a plurality of acquired image signals.

The at least one element comprises at least one of a red element outputting a signal corresponding to a red light, a green element outputting a signal corresponding to a green light, and a blue element outputting a signal corresponding to a blue light.

In accordance with another aspect of the present invention, an image acquisition apparatus comprises: an image sensor in which a red element outputting a signal corresponding to a red light, a green element outputting a signal corresponding to a green light, and a blue element outputting a signal corresponding to a blue light are arranged in a predetermined pattern; a driving unit configured to move the image sensor to a plurality of positions; an image processor configured to receive a signal output from the red element, the green element and the blue element in the plurality of positions, respectively, and configured to acquire an image of an object by combining the received signal; and a printing unit configured to print the acquired image on a printing medium.

BRIEF DESCRIPTION OF THE DRAWINGS

These and/or other aspects of the invention will become apparent and more readily appreciated from the following description of the embodiments, taken in conjunction with the accompanying drawings.

FIG. 9 is a view of an arrangement of an imaging element to output a blue color image signal.

FIG. 27 is a view of an example of acquiring an image signal when a first light source is turned off and a second light source is turned on.

FIG. 28 is a view of an example of an image signal acquired when a first light source is turned off and a second light source is turned on.

DETAILED DESCRIPTION

Figure 1:
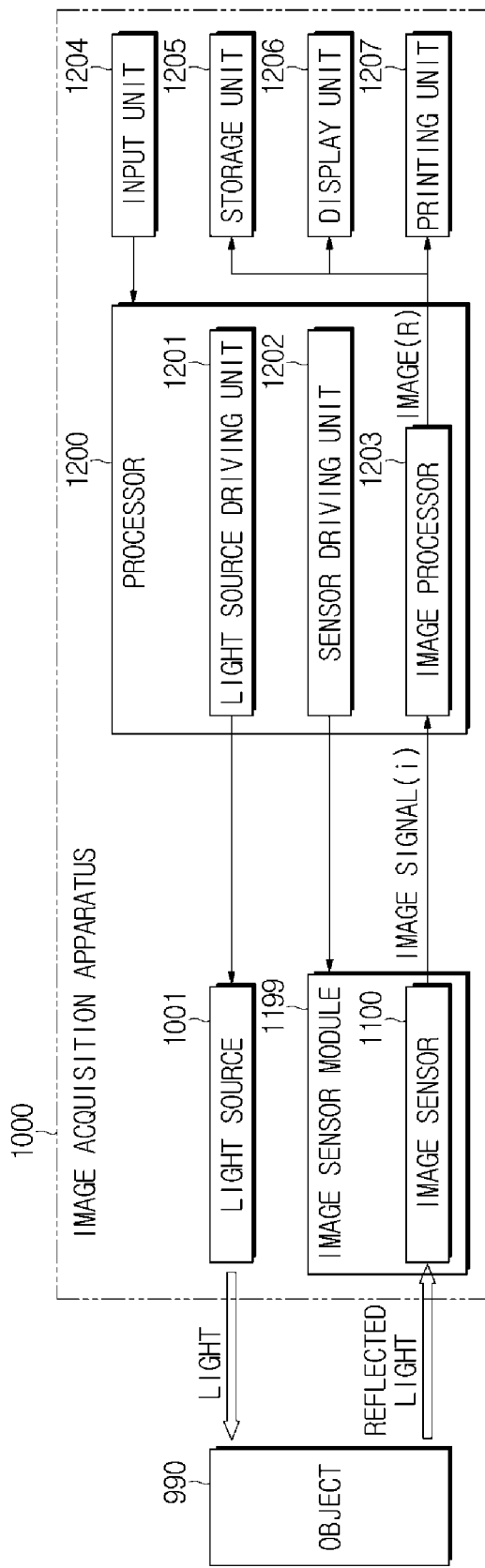
FIG. 1 is a block diagram of an image acquisition apparatus in accordance with an embodiment of the present disclosure.

Reference will now be made in detail to the embodiments of the present disclosure, examples of which are illustrated in the accompanying drawings, wherein like reference numerals refer to like elements throughout.

Hereinafter an embodiment of an image acquisition apparatus will be described with reference to FIGS. 1 to 22.

Figure 2A:
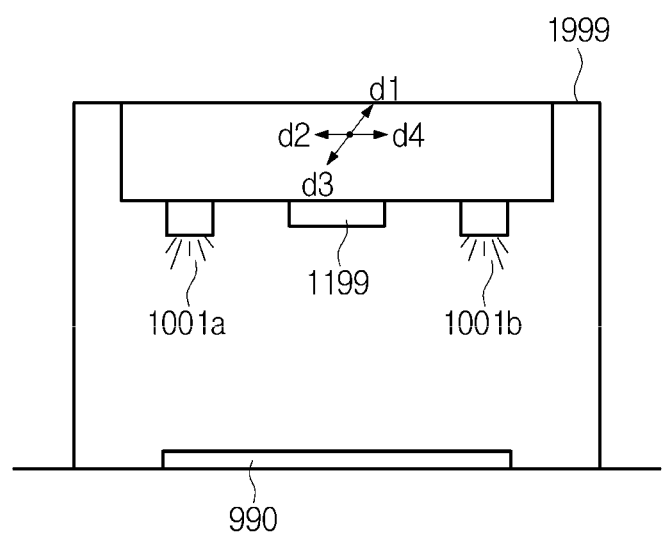
FIG. 2A is a view of an image acquisition apparatus in accordance with an embodiment of the present disclosure.

FIG. 1 is a block diagram of an image acquisition apparatus in accordance with an embodiment of the present disclosure, and FIG. 2A is a view of an image acquisition apparatus in accordance with an embodiment of the present disclosure.

Referring to FIG. 1, an image acquisition apparatus 1000 may include a light source 1001, an image sensor module 1199, and a processor 1200. The image acquisition apparatus 1000 may include at least one of an input unit 1204, a storage unit 1205, a display unit 1206, and a printing unit 1207.

As illustrated in FIGS. 1 and 2A, the light source 1001 may radiate a light of a certain color toward an object 990 according to a control of a light source driving unit 1201. The light radiated from the light source 1001 may be incident to the image sensor module 1199 after being reflected by a surface of the object 990.

The object 990 may represent a thing that is a subject to be imaged. The object 990 may include a piece of paper or a book in which a variety of letters, symbols, numbers, a figure, and a picture is described, illustrated or printed in at least one color, and may further include a three-dimensional object, e.g. a sculpture. In addition, the object 990 may include a variety of things that are intended to be a subject to be imaged by a user.

Referring to FIG. 2A, according to an embodiment, the object 990 may be placed on an upper surface of a bottom 1999a of an external housing 1999 of the image acquisition apparatus 1000 A surface of the object 990 that is subject to be imaged may be placed in a direction in which the image sensor module 1199 is disposed.

As illustrated in FIG. 2A, a plurality of the light sources 1001a and 1001b may be provided in the image acquisition apparatus 1000, and for example, two light sources, i.e. a first light source 1001a and a second light source 1001b may be provided. The two light sources 1001a and 1001b may be installed in a position to appropriately radiate a light to the object 990, according to a designer's selection.

For example, the two light sources 1001a and 1001b may be disposed in an appropriate position so that a light is incident to all surfaces or most of the surfaces of the object 990 placed in the upper surface of the bottom 1999a of the external housing 1999. In other words, a light radiated from the first light source 1001a may be incident to all surfaces or most of the surfaces of the object 990, and also a light radiated from the second light source 1001b may be incident to all surfaces or most of the surfaces of the object 990.

According to an embodiment, the two light sources 1001a and 1001b may be disposed to be opposite to each other with respect to the image sensor module 1199. In this case, a distance between the image sensor module 1199 and any one of the two light sources, e.g. the first light source 1001a may be the same as or approximately the same as a distance between the image sensor module 1199 and the other of the two light sources, e.g. the second light source 1001b.

According to an embodiment of the present disclosure, the light source 1001 may be provided to be movable.

The light source 1001 may be implemented by a variety of lightings, e.g. an incandescent lamp, a halogen lamp, a fluorescent lamp, a sodium lamp, a mercury lamp, a fluorescent mercury lamp, an xenon lamp, an arc lamp, a neon tube lamp, an electroluminescent (EL) lamp, a light emitting diode (LED), Cold Cathode Fluorescent Lamp (CCFL) or an external electrode fluorescent lamp (EEFL).

The image sensor module 1199 may receive a light transmitted from a direction of the object 990 including a light reflected from the object 990, and output an electrical signal corresponding to the received light thereby acquiring an image signal of the object 990.

According to an embodiment, the image sensor module 1199 may be provided to be movable in at least one direction. As illustrated in FIG. 2A, the image sensor 1100 may be provided to be movable in a direction, for example, (d1 to d4) perpendicular to a line connecting the object 990 and the image sensor module 1199. Accordingly, the image sensor module 1199 may be movable while keeping in a direction toward the image sensor 1100. The direction to which the image sensor 1100 faces may include a direction in which the object 990 is placed or the object 990 is allowed to be placed, and a direction in which the upper surface of the bottom 1999a of the external housing 1999 is disposed. In other words, the image sensor 1100 may face a direction in which the object 990 is placed while being movable, for example, in a direction (d1 to d4) perpendicular to a direction in which the object 990 is placed.

The image sensor module 1199 may be movable in a plurality of directions (d1 to d4). Hereinafter a movement direction of the image sensor module 1199 may be referred to as "a first direction to a fourth direction" (d1 to d4). A least two directions of the plurality of directions (d1 to d4), e.g. a first direction (d1) and a second direction (d2), and the first direction (d1) and a fourth direction (d4) may be disposed to be perpendicular to each other. A third direction (d3) and the fourth direction (d4) may be disposed to be perpendicular to each other. At least two directions of the plurality of directions (d1 to d4), e.g. the first direction (d1) and the third direction (d3), and the second direction (d2) and the fourth direction (d4) may be disposed to be opposite to each other.

Figure 2B:
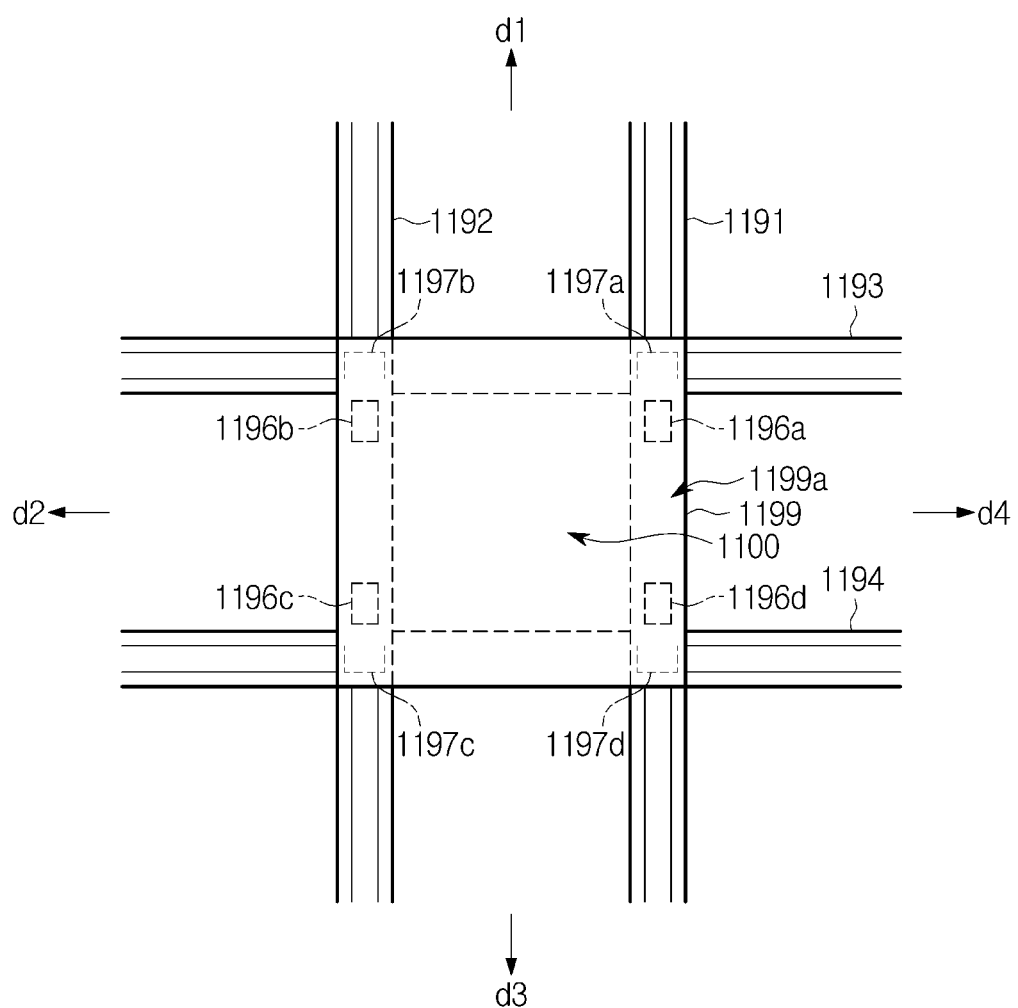
FIG. 2B is a view of a motion of an image sensor module.

FIG. 2B is a view of a motion of an image sensor module.

The image sensor module 1199 may be configured to be movable in a variety of directions (d1 to d4) by using a variety of methods. For example, as illustrated in FIG. 2B, the image sensor module 1199 may be selectively moved in the plurality of directions (d1 to d4) through a plurality of rails 1191 to 1194 and a plurality of wheels 1196a to 1196d and 1197a to 1197d that are drivable on the plurality of rails 1191 to 1194.

For example, wheels 1196a to 1196d, which are movable according to an operation of a motor (not shown) that are separately connected, may be installed on a surface of a housing 1199a supporting the image sensor module 1199, and the movable wheels 1196a to 1196d may be placed on two rails extended in parallel to each other i.e., a first rail 1191 and a second rail 1192. Accordingly, the image sensor module 1199 may be movable in any direction from the first direction (d1) to the third direction (d3) along the first rail 1191 and the second rail 1192. The image sensor module 1199 may be moved in the first direction (d1) or the third direction (d3) according to a rotation direction of the wheel 1196a to 1196d.

The first rail 1191 and the second rail 1192 may be provided to be movable on the third rail 1193 and the fourth rail 1194, and the first rail 1191 and the second rail 1192 may be perpendicular to the third rail 1193 and the fourth rail 1194, as illustrated in FIG. 2B. When the image sensor module 1199 is placed on a surface of the first rail 1191 and the second rail 1192, a wheel 1197a to 1197d, which are movable according to an operation of a motor (not shown) that is separately connected, may be installed on the other surface thereof. The movable wheel 1197a to 1197d may be placed on the third rail 1193 and the fourth rail 1194, and the first rail 1191 and the second rail 1192 may be moved along the third rail 1193 and the fourth rail 1194 according to the rotation of the wheel 1197a to 1197d. Accordingly the image sensor module 1199 may be moved according to the movement of the first rail 1191 and the second rail 1192. Therefore, the image sensor module 1199 may be movable in any direction of the second direction (d2) and the fourth direction (d4). The image sensor module 1199 may be moved in the second direction (d2) or in the fourth direction (d4) according to a rotation direction of the wheel 1197a to 1197d.

Hereinbefore an example of a method of moving the image sensor module 1199 is described, but the method of moving the image sensor module 1199 is not limited thereto. For example, the image sensor module 1199 may be movable by using various means, e.g. a robot arm or a hydraulic cylinder. In addition, the image sensor module 1199 may be designed to be movable by employing a variety of methods considered by a designer.

The image sensor module 1199 may include a lens (not shown) to focus a light delivered from the direction of the object 990, an image sensor 1100 to which a light transmitted through the lens is incident and the light is converted into an electrical signal, and a variety of components configured to support an operation of the lens and the image sensor 1100.

Figure 3:
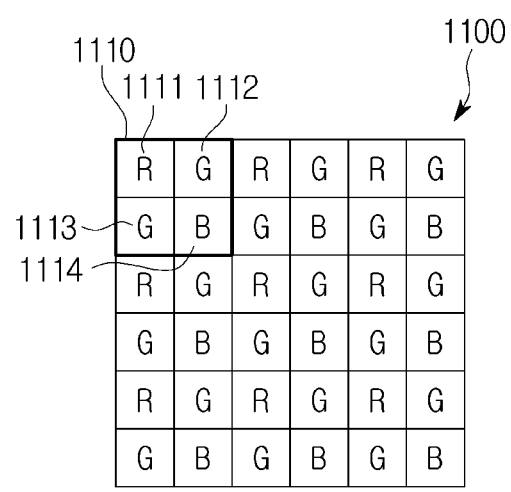
FIG. 3 is a view of an image sensor in accordance with an embodiment of the present disclosure.

FIG. 3 is a view of an image sensor in accordance with an embodiment of the present disclosure.

As illustrated in FIG. 3, the image sensor 1100 may include a plurality of imaging elements 1101 to 1104. Each of the imaging elements 1101 to 1104 may receive a light and generate an electrical signal corresponding to the received light, thereby outputting the electrical signal. Each of the imaging elements 1101 to 1104 may be implemented by charge coupled devices (CCD) and complementary metal-oxide semiconductors (CMOS), but is not limited thereto. The imaging element may be implemented by a variety of elements configured to convert a light into an electrical signal according to embodiments.

The imaging elements 1101 to 1104 may include a red imaging element 1101 to output an electrical signal corresponding to a red light wavelength from a received light, a green imaging element 1102 and 1103 to output an electrical signal corresponding to a green light wavelength from a received light, and a blue imaging element 1104 to output an electrical signal corresponding to a blue light wavelength from a received light.

The imaging elements 1101 to 1104 may be arranged in a certain pattern. For example, the imaging elements 1101 to 1104 may be arranged in a matrix structure, as illustrated in FIG. 3, and the arrangement pattern of the red imaging element 1101, the green imaging element 1102 and 1103, and the blue imaging element 1104 may include a mosaic pattern.

The imaging element array of the image sensor 1100 may be divided into a plurality of unit areas 1110, and each unit area 1110 may be formed with four elements 1101 to 1104. In a single unit area 1110, the imaging elements 1101 to 1104 may be arranged in a certain pattern. For example, as illustrated in FIG. 3, in the single unit area 1110, the red imaging element 1101 may be disposed in any one position, the green imaging element 1102 and 1103 may be disposed on the left and right side and the upper side and lower side of the red imaging element 1101, and the blue imaging element 1104 may be disposed in the remaining one position, that is an upper direction ora lower direction of a diagonal line of the red imaging element 1101. In an other unit area, the plurality of imaging elements 1101 to 1104 may be disposed in the same pattern as the above mentioned pattern.

Hereinafter the red imaging element 1101, the green imaging element 1102 and 1103, and the blue imaging element 1104 are described in detail.

Figure 4:
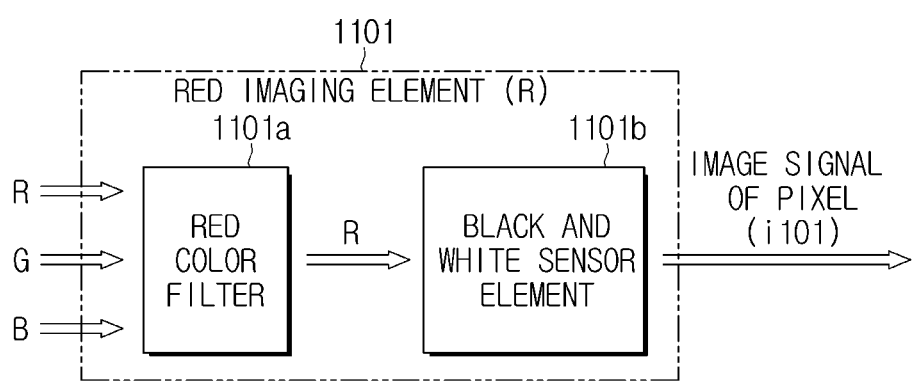
FIG. 4 is a block diagram of an imaging element to which a red color filter is applied in accordance with an embodiment of the present disclosure.
Figure 5:
FIG. 5 is a view of an arrangement of an imaging element to output a red color image signal.

FIG. 4 is a block diagram of an imaging element to which a red color filter is applied in accordance with an embodiment of the present disclosure, and FIG. 5 is a view of an arrangement of an imaging element to output a red color image signal.

As illustrated in FIG. 4, the red imaging element 1101 may include a red color filter 1101a configured to transmit only a red color light to a black and white sensor element 1101b by receiving a light in which a red color, a green color and a blue color are combined and by filtering the green color and the blue color, and a black and white sensor element 1101b configured to output an electrical signal by detecting an intensity of an output red color, e.g. a brightness of a light. Therefore, in the red imaging element 1101, a wavelength corresponding to the green color and the blue color may be removed and an image signal (i101) that is acquired from a wavelength corresponding to the red color may be output.

Each of the red imaging element 1101 may output the image signal (i101) corresponding to the red color light, and when the red imaging element 1101 is arranged, as illustrated in FIG. 3, a group of the image signals (i110) corresponding to a red light that is acquired by the red imaging element 1101 may have a pattern as illustrated in FIG. 5. A ratio of an area (R0), where an electrical signal is output from the red imaging element 1101, to an entire area (RT) of the image sensor 1100 may be approximately 25%. In other words, information related to the red color acquired by the image sensor 1100 may acquire a piece that is approximately 25% of entire information about the red color transmitted to the image sensor 1100 from the outside.

Figure 6:
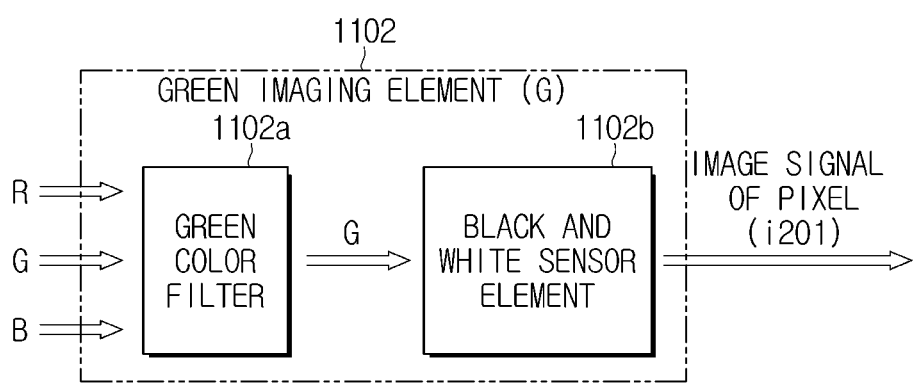
FIG. 6 is a block diagram of an imaging element to which a green color filter is applied in accordance with an embodiment of the present disclosure.
Figure 7:
FIG. 7 is a view of an arrangement of an imaging element to output a green color image signal.

FIG. 6 is a block diagram of an imaging element to which a green color filter is applied in accordance with an embodiment of the present disclosure, and FIG. 7 is a view of an arrangement of an imaging element to output a green color image signal.

As illustrated in FIG. 6, the green imaging element 1102 may include a green color filter 1102a configured to transmit only a green color light by receiving a light in which a red color, a green color and a blue color are combined and by filtering the red color and the blue color, and a black and white sensor element 1102b configured to detect an intensity of an output green that is transmitted by the green imaging element 1102a and to output an electrical signal corresponding to the result of the detection. Therefore, in the green imaging element 1102, a wavelength corresponding to the red color and the blue color may be removed and an image signal (i201) that is acquired from a wavelength corresponding to the green color may be output.

When the green imaging element 1102 is arranged, as illustrated in FIG. 3, a group (i120) of the image signals (i201) that is acquired by the green imaging element 1102 may have a pattern as illustrated in FIG. 7. A ratio of an area (G0), where an electrical signal is output from the green imaging element 1102, to an entire area (GT) of the image sensor 1100 may be approximately 50%. As illustrated in FIG. 3, the green imaging element 1102 may be disposed in the image sensor 1100 two times more than the red imaging element 1101 and the blue imaging element 1104, and thus the amount of information of the acquired green color may be two times more than the amount of information of the red color and the blue color.

Figure 8:
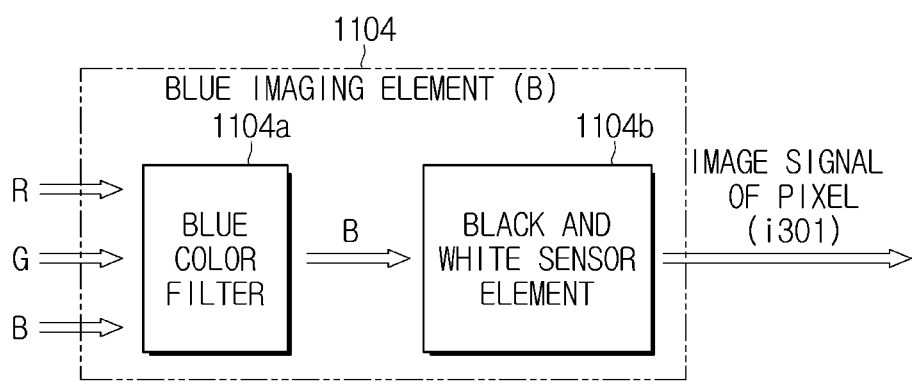
FIG. 8 is a block diagram of an imaging element to which a blue color filter is applied in accordance with an embodiment of the present disclosure.

FIG. 8 is a block diagram of an imaging element to which a blue color filter is applied in accordance with an embodiment of the present disclosure, and FIG. 9 is a view of an arrangement of an imaging element to output a blue color image signal.

Similar to the red imaging element 1101 and the green imaging element 1102, the blue imaging element 1104 may include a blue color filter 1104a configured to acquire only a blue color light from a received light after receiving a light in which a red color, a green color and a blue color are combined, and a black and white sensor element 1104b configured to detect an intensity of an output blue light that is transmitted from the blue color filter 1104a and to output an electrical signal corresponding to the result of the detection, as illustrated in FIG. 8. Therefore, in the blue imaging element 1104, the red color and the green color may be removed and an image signal (i301) corresponding to the blue color may be output.

When the blue imaging element 1104 is arranged, as illustrated in FIG. 3, a group (i130) of the image signals (i301) corresponding to a blue color that is acquired by the blue imaging element 1104 may be output in as a pattern illustrated in FIG. 9. A ratio of an area (B0), where an electrical signal is output from the blue imaging element 1104, to an entire area (BT) of the image sensor 1100 may be approximately 25%. In other words, information related to the blue color acquired by the image sensor 1100 may acquire approximately 25% of entire information about the blue color transmitted to the image sensor 1100 from the outside.

As illustrated in FIGS. 4 to 9, each of the imaging elements 1101 to 1104 may output an image signal (i101, i201 and i301) corresponding to a certain color, and since the imaging element 1101 to 1104 is disposed on a part position of each of the image sensors 1100, a piece of information related to the color may be lost. The image sensor module 1199 of the image acquisition apparatus 1000 may prevent the loss of the information by being moved in a certain direction (d1 to d4).

Referring to FIG. 1, the image signals (i101, i201 and i301) acquired by each of the imaging elements 1101 to 1104 may be transmitted to a processor 1200.

According to an embodiment, the processor 1200 may include a light source driving unit 1201, a sensor driving unit 1202, and an image processor 1203.

The light source driving unit 1201 may control an operation of the light source 1001 by using a method, e.g. controlling a power of electricity applied to the light source 1001. According to an embodiment, the light source driving unit 1201 may allow any one of the plurality of light sources 1001a and 1001b to be turned on and the other thereof to be turned off. The light source driving unit 1201 may allow the second light source 1001b to be turned off when the first light source 1001a is turned on, and the light source driving unit 1201 may allow the first light source 1001a to be turned off when the second light source 1001b is turned on. Accordingly, the light source driving unit 1201 may turn on or off the plurality of light sources 1001a and 1001b in order so that the image sensor 1100 may acquire an image signal of the object 990 in sequence without a glare spot.

The sensor driving unit 1202 may control the image sensor module 1199 so that the image sensor module 1199 is moved in the certain direction (d1 to d4). In this case, the sensor driving unit 1202 may control the image sensor module 1199 so that the image sensor module 1199 is moved in the first direction (d1), the second direction (d2), the third direction (d3) and the fourth direction (d4) in order or in inverse order. Particularly, the sensor driving unit 1202 may apply an electrical signal to the motor (not shown) provided in the image sensor module 1199 so as to control the plurality of wheels 1196a to 1196d and 1197a to 1197d provided in the image sensor module 1199 so that the plurality of wheels 1196a to 1196d and 1197a to 1197d is rotated. According to the rotation of the plurality of wheels 1196a to 1196d and 1197a to 1197d, the image sensor module 1199 may be moved in at least one direction of the first direction (d1), the second direction (d2), the third direction (d3) and the fourth direction (d4).

The image processor 1203 may generate and restore an image (R) to have a form to allow a user to view based on an image signal output from the image sensor 1100. The image processor 1203 may generate a single image (R) by combining image signals that is acquired by the image sensor 1100 while moving. According to an embodiment, the image sensor 1100 may acquire an image signal while moving by a pixel unit, and the pixel may represent a minimum unit of an image and may correspond to the each of the imaging elements 1101 to 1104.

According to an embodiment, when restoring and generating an image (R), the image processor 1203 may combine a plurality of images, which are acquired by the image signal, by using a stitching method so as to restore and generate the ultimate image (R). In addition, the image processor 1203 may generate the image (R) by removing a part of the acquired image signal and then combining other part.

The image processor 1203 may perform a variety of processes on the generated image (R). For example, the image processor 1203 may apply a blur effect or a sharpness effect by applying a low pass filter or a high pass filter. The image processor 1203 may perform a variety of processes on all or part of the generated image (R).

An input unit 1204 may output an electrical signal corresponding to an operation of a user and transmit the electrical signal to the processor 1200. Accordingly, the image acquisition apparatus 1000 may receive an input of a certain user's command from a user to be operated according to the received user command. The input unit 1024 may be implemented by at least one of a variety of physical buttons, a key board, a knob, a stick type operation device, a mouse device, a jog shuttle, a track ball, a track pad, a touch pad and a touch screen.

The storage unit 1205 may temporarily or non-temporarily store an image (R) generated by the image processor 1203 or store a variety of commands, data, or programs related to an operation of the image acquisition apparatus 1000. The storage unit 1205 may be implemented using a main storage device and an auxiliary storage device, wherein the main storage device and auxiliary storage device are implemented using at least one of a magnetic disk storage device, a magnetic tape storage device, and a semiconductor storage device, and in addition, it may also be implemented using a variety of media that can store data. The image (R) stored in the storage unit 1205 may be displayed on the display unit 1206 according to a predetermined setting or a user's selection, or may be stored in printing media through the printing unit 1207.

The display unit 1206 may display the image (R) generated by the image processor 1203 or a variety of information related to the control and the operation of the image acquisition apparatus 1000. The variety of information related to the control and the operation that is displayed on the display unit 1206 may be implemented in a graphic user interface type.

The display unit 1206 may be implemented by Cathode Ray Tube (CRT) or a variety of display panels. The display panel may be implemented by employing any one of Liquid Crystal Display (LCD) panel, Light Emitting Diode (LED) display panel, Organic Light Emitting Diode (OLED) display panel or Active-Matrix Organic Light Emitting Diode display panel. According to an embodiment, the display unit 1206 may be implemented by a touch screen, and in this case, the display unit 1206 may perform a function of the input unit 1205.

The printing unit 1207 may be configured to print the image (R) generated by the image processor 1203 on a print medium, e.g. a piece of printing paper to provide the image (R) to a user. The printing unit 1207 may print the image (R) generated by the image processor 1203 on the print medium by ejecting and radiating ink of minor liquid droplets in a desired position of the print medium and may print the image (R) generated by the image processor 1203 by supplying a toner to an electrostatic latent image formed by scanning light onto a photosensitive body and then by transferring the electrostatic latent image with the toner onto the print medium. In addition, the printing unit 1207 may be implemented using a variety of means that can be considered by the designer.

All or any one of the input unit 1204, the storage unit 1205, the display unit 1206 and the printing unit 1207 may be provided in a separate computer device (not shown), which is communicably connected to the image acquisition apparatus 1000, other than the image acquisition apparatus 1000. The computer device may be communicably connected to the image acquisition apparatus 1000 via at least one of a wired communication network and a wireless communication network. The wired communication network may be configured using various cables, such as a pair cable, a coaxial cable, an optical fiber cable or an Ethernet cable, and the wireless communication network may be implemented using a local area communication standard, such as a wireless fidelity (Wi-Fi) standard technology, or a mobile communication standard, such as a 3rd generation (3GPP)-based wireless communication technology, such as long term evolution (LTE).

Hereinafter, a process of acquiring an image by moving the image sensor 1100 according to an embodiment will be described in details, with reference to FIGS. 10A to 22.

Figure 10A:
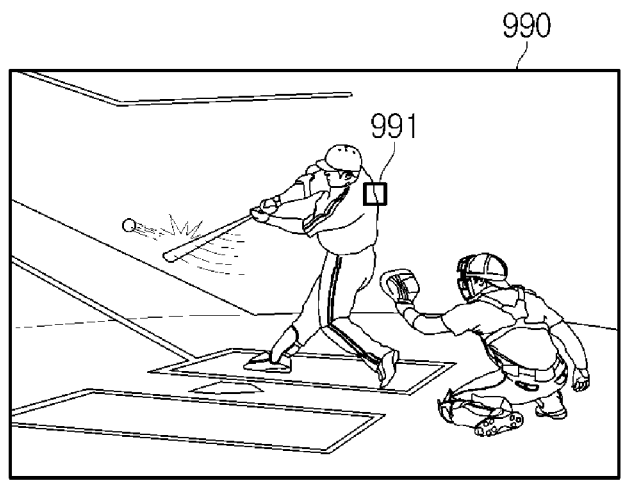
FIG. 10A is a view of an example of an object subject to be imaged.
Figure 10B:
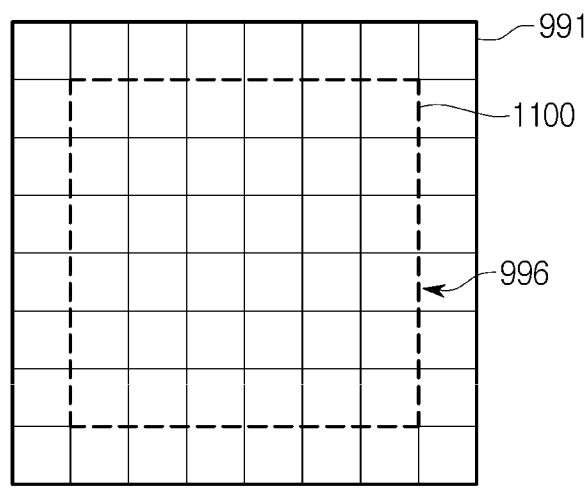
FIG. 10B is an enlarged view of a portion of an object.

FIG. 10A is a view of an example of an object subject to be imaged, and FIG. 10B is an enlarged view of a portion of an object.

As illustrated in FIG. 10A, the object 990 may be a picture in which a certain image is formed. The image sensor 1100 of the image sensor module 1199 may acquire a plurality of image signal of the object 990 by photographing a front surface of the object 990 to acquire image information of the front surface of the object 990.

For the convenience of the description, the following description will be limited to a one portion 991 that is one portion of the object 990 to describe a configuration for acquiring the image signal. However, it may be apparent that the image signal is acquired about other portion except for the one portion 991 of the object 990 via the above mentioned method or some modified method thereof.

Referring to FIG. 10B, the first portion 991 of the object 990 may be virtually divided into a plurality of areas 992 to 995. Each of areas 992 to 995 may have the same size as that of each imaging element 1101 to 1104 of the image sensor 1100, and may be arranged in a matrix structure to correspond to the arrangement structure of the imaging element 1101 to 1104. The arrangement position and the size of areas 992 to 995 is configured for the convenience of the description, and thus when the image acquisition apparatus 1000 is implemented in practice, the areas 992 to 995 may be not implemented as mentioned above.

The image sensor 1100 may acquire a plurality of image signals of the first portion 991 of the object 990 while moving in at least one direction in the first portion 991 of the object.

Figure 11:
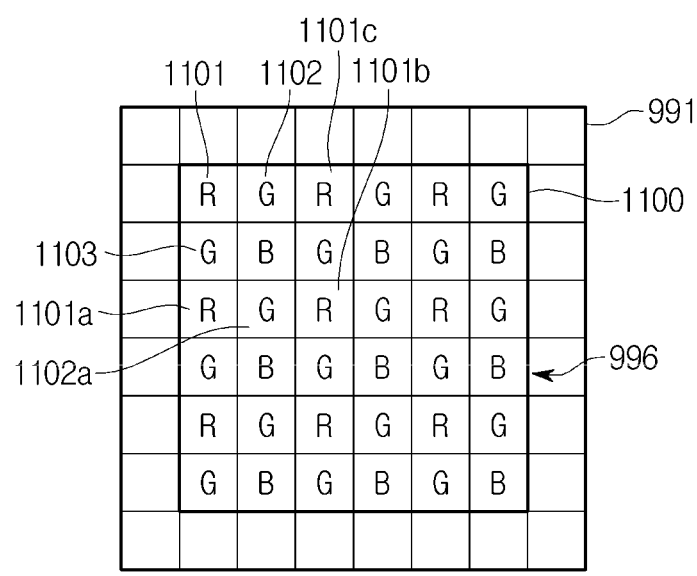
FIG. 11 is a view of a first position of an image sensor.
Figure 12:
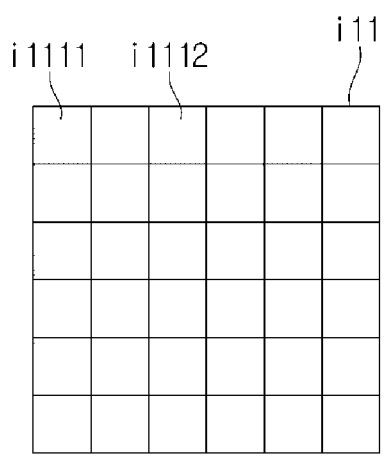
FIG. 12 is a view of an example of outputting a red image signal according to a position of a red imaging element when an image sensor is placed in a first position.

FIG. 11 is a view of a first position of an image sensor, and FIG. 12 is a view of an example of outputting a red image signal according to a position of a red imaging element when an image sensor is placed in a first position.

As illustrated in FIG. 11, all ora portion of the image sensor 1100 may be disposed in a position (hereinafter refer to a first position) corresponding to a portion 996 of the first portion 991 of the object 990. When the image sensor 1100 is disposed in the first position, any one of red color imaging element e.g. a first red color imaging element 1101, may be disposed to correspond to any one area of the first portion 991 e.g. a first area 992. When a light is radiated from the light source 1001, the light may be reflected by the first portion 991 and the reflected light may be incident to the red color imaging element 1101 to 1101c. For example, the light reflected by the first area 992 of the first portion 991 may be incident to the red imaging element 1101. When a light is incident, the red color imaging element 1101 to 1101c may filter a green light and a blue light among the reflected light, and then output an image signal (i 101) corresponding to a red light.

As illustrated in FIG. 12, the image sensor 1100 may acquire the first image signal (i11). An image signal (i1111 to i1112) corresponding to the red light may be acquired in a position in which the red imaging element e.g. the first red imaging element 1101 and the fourth red imaging element 1101c, is placed, and an image signal corresponding to the red light may not be acquired in an other position. Therefore, only a portion of the first image signal (i11) may include an image signal (i1111 and i1112, etc.) corresponding to the red light.

As illustrated in FIGS. 4 and 5, the first image signal (i11) may include a piece i.e. approximately 25% of information of the red color that is delivered from the outside to the image sensor 1100.

Figure 13:
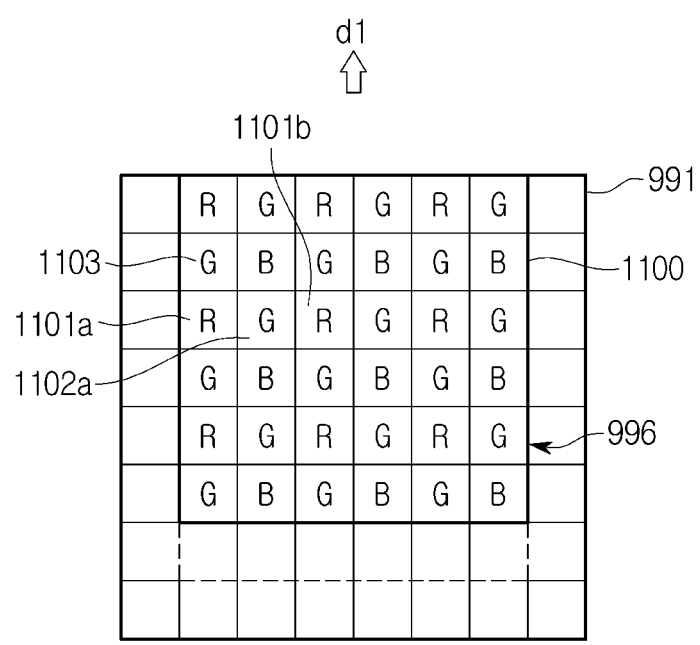
FIG. 13 is a view of an image sensor that is moved to a second position.
Figure 14:
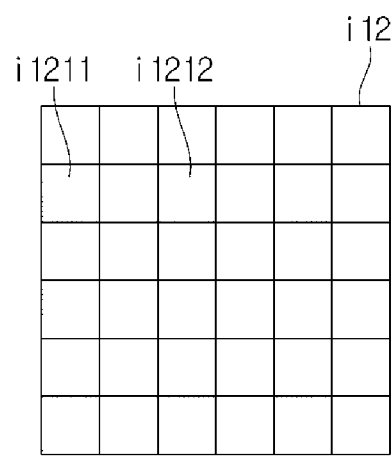
FIG. 14 is a view of an example of outputting a red image signal according to a position of a red imaging element when an image sensor is placed in a second position.

FIG. 13 is a view of an image sensor that is moved to a second position, and FIG. 14 is a view of an example of outputting a red image signal according to a position of a red imaging element when an image sensor is placed in a second position.

Referring to FIG. 13, the image sensor module 1199 may be moved to the first direction (d1) and thus the image sensor 1100 may be moved in accordance with the movement of the image sensor module 1199. Each of red imaging element s 1101 to 1101c may be moved according to the movement to the image sensor 1100. The first direction (d1) may include an upper direction on the drawings in accordance with FIGS. 11 to 13. However, the first direction (d1) may be an example, and thus the image sensor module 1199 may be moved in a direction opposite to the first direction (d1) or a direction perpendicular to the first direction (d1) according to a designer's selection.

When the image sensor module 1199 is moved in the first direction (d1), the image sensor module 1199 may be moved as far as a height or a width of each of imaging element 1101, 1102, and 1103, and then stopped to reach a second position. The second position may represent a position to allow any one of red imaging elements, e.g. a second red imaging element 1101a to be disposed to correspond to any one area of the first portion 991, e.g. a second area 993. The second area 993 may be an area making a contact with the first area 992. As illustrated in FIGS. 10B to 13, the second area 993 may be an area under the first area 992 on the drawings.

In a state in which the image sensor module 1199 is placed in the second position, when a light is radiated from the light source 1001, a light may be reflected by the second area 993 and the reflected light may be incident to the second red imaging element 1101a. The second red imaging element 1101a may output an image signal (i101) corresponding to the red light among the reflected light.

As illustrated in FIG. 14, the image sensor 1100 may acquire a second image signal (i12) corresponding to the one portion 996 of the first portion 991. An image signal (i1211 and i1212) corresponding to the red light may be acquired in a position in which the red imaging element, e.g. the second red imaging element 1101a and the third red imaging element 1101b are placed, and the image signal corresponding to the red light may not be acquired in an other position. Therefore, a portion of the second image signal (i12) may include an image signal (i1211 and i1212, etc.) corresponding to the red light. According to the movement of the image sensor 1100, the image signal (i1211 and i1212) included in the second image signal (i12) may be not overlapped with the image signal (i1111 and i1112) included in the first image signal (i11).

The second image signal (i12) may include approximately 25% of entire information, as illustrated in FIG. 14.

Figure 15:
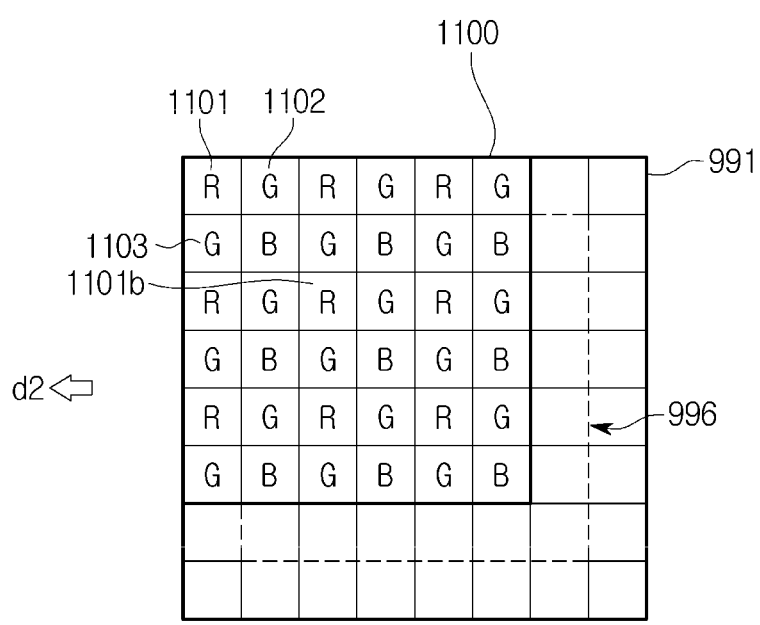
FIG. 15 is a view of an image sensor that is moved to a third position.
Figure 16:
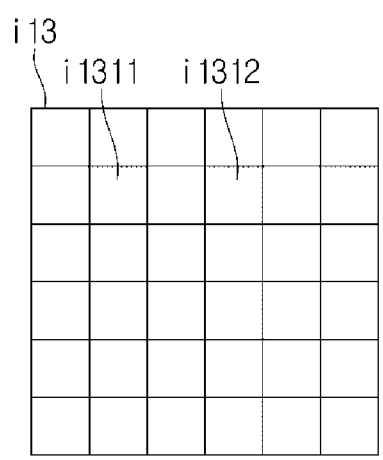
FIG. 16 is a view of an example of outputting a red image signal according to a position of a red imaging element when an image sensor is placed in a third position.

FIG. 15 is a view of an image sensor that is moved to a third position, and FIG. 16 is a view of an example of outputting a red image signal according to a position of a red imaging element when an image sensor is placed in a third position.

Referring to FIG. 15, the image sensor module 1199 may be moved to the second direction (d2) and thus the image sensor 1100 and the each of red imaging element 1101 to 1101c provided in the image sensor 1100 may be moved in accordance with the movement of the image sensor module 1199. The second direction (d2) may include the left direction on the drawings in accordance with FIGS. 11 to 15. However, the second direction (d2) is an example, and thus the image sensor module 1199 may be moved in a direction opposite to the second direction (d2), as illustrated in FIG. 15 or a direction perpendicular to the second direction (d2) according to a designer's selection.

When the image sensor module 1199 is moved to the second direction (d2), the image sensor module 1199 may be moved as far as a height or a width of each of imaging element 1101, 1102, and 1103, and then stopped to reach a third position, as mentioned above. The third position may represent a position in which any one of red imaging element e.g. a third red imaging element 1101b corresponds to any one area of the first portion 991 e.g. a third area 994. The third area 994 may be an area making a contact with the second area 993, and may be disposed in the right side of the second area 993, as illustrated in FIG. 10B.

In a state in which the image sensor module 1199 is placed in the third position, when a light is radiated from the light source 1001, a light may be reflected by the third area 994 and the reflected light may be incident to the third red imaging element 1101b. The third red imaging element 1101b may output an image signal (i101), wherein the image signal (i101) may be an image signal corresponding to the red light among the reflected light.

As illustrated in FIG. 16, the image sensor 1100 may acquire a third image signal (i13) corresponding to the one portion 996 of the first portion 991. An image signal (i1311) corresponding to the red light may be acquired in a position in which the red imaging element e.g. the third red imaging element 1101b is placed, and the image signal corresponding to the red light may be not acquired in other position. Therefore, a certain portion of the third image signal (i13) may include an image signal (i1311 and i1312, etc.) corresponding to the red light. According to the movement of the image sensor 1100, the image signal (i1311 and i1312) included in the third image signal (i13) may be not overlapped with the image signal (i1111 and i1112) included in the first image signal (i11) and the image signal (i1211 and i1212) included in the second image signal (i12).

The third image signal (i13) may be formed by including approximately 25% of entire information.

Figure 17:
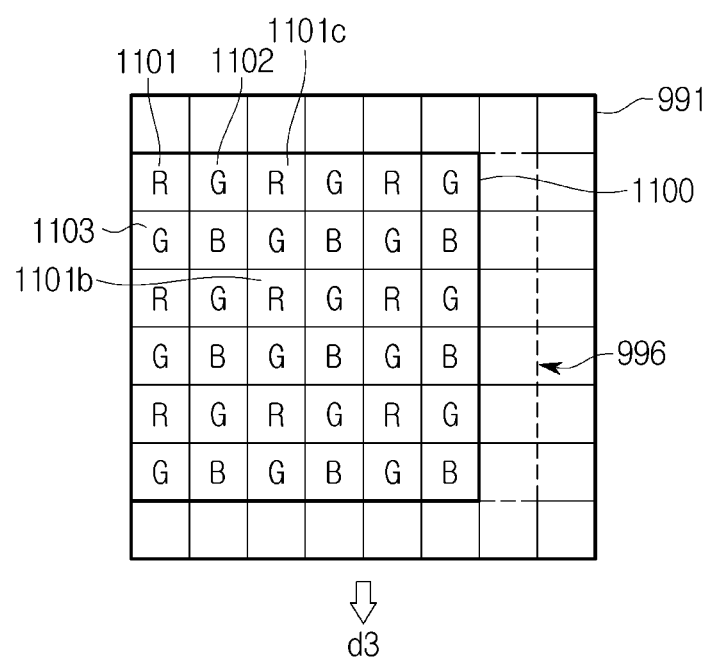
FIG. 17 is a view of an image sensor that is moved to a fourth position.
Figure 18:
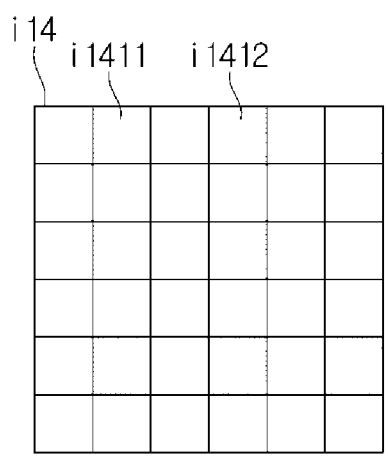
FIG. 18 is a view of an example of outputting a red image signal according to a position of a red imaging element when an image sensor is placed in a fourth position.

FIG. 17 is a view of an image sensor that is moved to a fourth position, and FIG. 18 is a view of an example of outputting a red image signal according to a position of a red imaging element when an image sensor is placed in a fourth position.

Referring to FIG. 17, the image sensor module 1199 may be moved to the third direction (d3), and thus the image sensor 1100 and the red imaging element 1101 to 1101c may be moved in accordance with the movement of the image sensor module 1199. The third direction (d3) may include the lower direction on the drawings in accordance with FIGS. 11 to 17. However, the third direction (d3) may be an example, and the third direction (d3) may be determined to be as various directions according to a designer's selection.

The image sensor module 1199 may be moved as far as a height or a width of each of imaging element 1101, 1102, and 1103, in the third direction (d3) and then stopped to reach a fourth position. The fourth position may represent a position in which any one of red imaging element e.g. a fourth red imaging element 1101c corresponds to any one area of the first portion 991 e.g. a fourth area 995. The fourth area 995 may be an area making a contact with the third area 994, and may be disposed under the third area 994, as illustrated in FIG. 10B.

In a state in which the image sensor module 1199 reaches the fourth position, when a light is radiated from the light source 1001, a light may be reflected by the fourth area 995 and the reflected light may be incident to the fourth red imaging element 1101c. The fourth red imaging element 1101c may output an image signal (i101) corresponding to the red light among the reflected light.

As illustrated in FIG. 18, the image sensor 1100 may acquire a fourth image signal (i14) corresponding to the one portion 996 of the first portion 991 by using the above-mentioned method. For example, an image signal (i1411) corresponding to the red light may be acquired in a position in which the red imaging element e.g. the fourth red imaging element 1101c is placed, and the image signal corresponding to the red light may be not acquired in other position. Therefore, a portion of the fourth image signal (i14) may include an image signal (i1411 and i1412, etc.) corresponding to the red light. The image signal (i1411 and i1412)

included in the fourth image signal (i14) may be not overlapped with any one of the image signal (i1111, i1112, i1211, i1212, i1311, and i1312), wherein the image signal (i1111 and i1112) are included in the first image signal, the image signal (i1211 and i1212) are included in the second image signal, and the image signal (i1311 and i1312) are included in the third image signal.

The fourth image signal (i14) may be formed by including approximately 25% of entire information, as mentioned above.

When the fourth image signal (i14) is acquired, the image sensor module 1199 may be moved to an initial position, that is the first position, and thus the image sensor module 1199 may acquire an image signal again. The movement of the image sensor module 1199 may be repeatedly performed. In other words, the image sensor module 1199 may be moved in the first position, the second position, the third position and the fourth position in order. The image sensor module 1199 may be allowed to be moved in the first position, the second position, the third position and the fourth position in inverse order.

Figure 19:
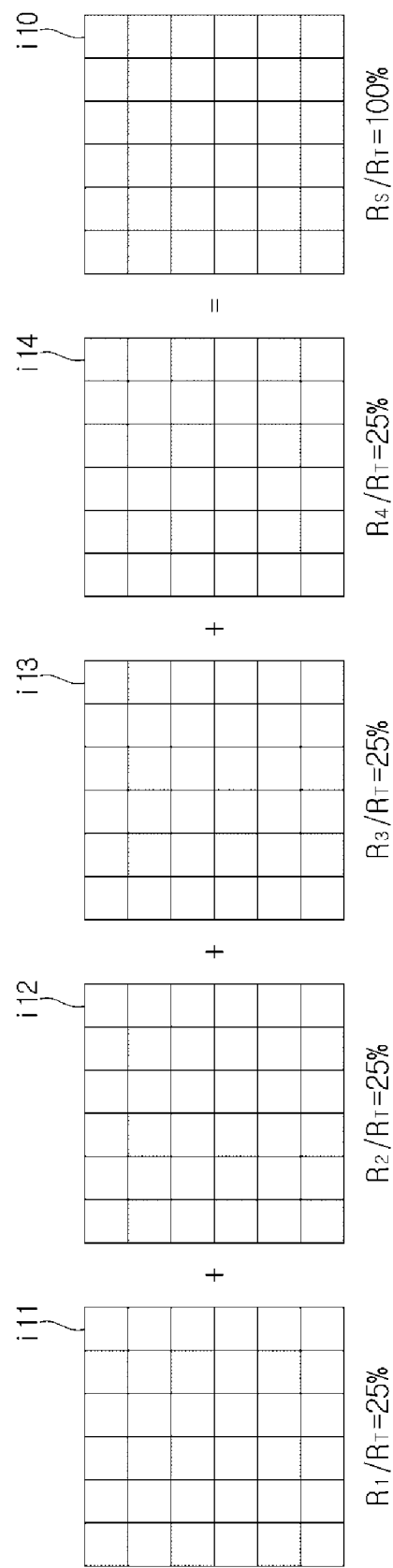
FIG. 19 is a view illustrating a combination of red image signals acquired in each position.

FIG. 19 is a view illustrating a combination of red image signals acquired in each position.

When the first image signal to the fourth image signal (i11 to i14) are acquired from the red imaging element 1101 to 1101c, the image processor 1203 may acquire a single red color image (i10) by combining the signals (i11 to i14). The red color image (i10) may be an image formed by information corresponding to the red light among the light transmitted from the object 990.

Since each of the first image signal to the fourth image signal (i11 to i14) includes approximately 25% of entire information, respectively, that is R1/RT, R2/RT, R3/RT, and R4/RT as illustrated in FIG. 19, and since the first image signal to the fourth signal (i11 to i14) are not overlapped with each other, the image processor 1203 may acquire a single red color image (i10) including entire information, which is related to the red color transmitted from the outside to the image sensor 1100, by combining four image signals (i11 to i14) properly (RS/RT). In other words, the image sensor 1100 may receive all of the red light reflected from the one portion 996 of the first portion 991 of the object 990, and generate an image signal corresponding to the every red light to output the image signal. Accordingly, the image processor 1203 may acquire the single red color image (i10) including entire information.

By using the above-mentioned method, for example, the image sensor 1100 may receive every blue lights reflected by the one portion 996 of the first portion 991 of the object 990 and generate an image signal corresponding to the every blue color to output the image signal. Accordingly, the image processor 1203 may acquire a single blue color image including entire information.

Figure 20:
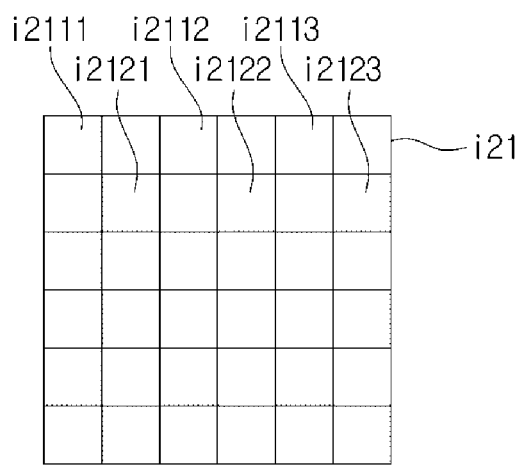
FIG. 20 is a view of an example of outputting a red image signal according to a position of a green imaging element when an image sensor is placed in a first position.
Figure 21:
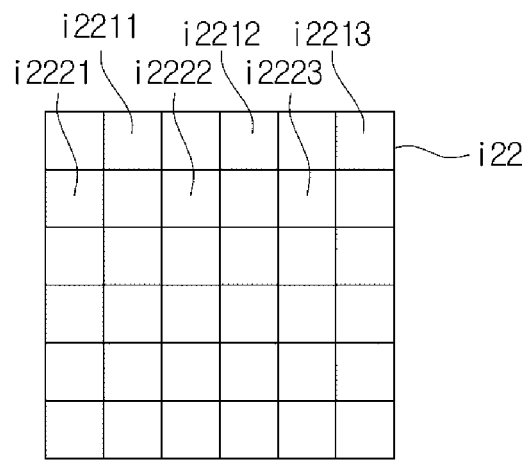
FIG. 21 is a view of an example of outputting a red image signal according to a position of a green imaging element when an image sensor is placed in a second position.

FIG. 20 is a view of an example of outputting a red image signal according to a position of a green imaging element when an image sensor is placed in a first position, and FIG. 21 is a view of an example of outputting a red image signal according to a position of a green imaging element when an image sensor is placed in a second position.

As illustrated in FIG. 3, since the green imaging element 1102 and 1103 is disposed more than double than the other imaging element 1101 and 1104 in the unit area 1110, the image sensor 1100 may acquire a green color image (i20) corresponding to every green lights reflected by the one portion 996 of the first portion 991 with a less movement in comparison with acquiring the red color image and the blue color image.

As illustrated in FIG. 11, when all ora portion of the image sensor 1100 is disposed in a position corresponding to the one portion 996 of the first portion 991 of the object 990, any one of green color imaging element e.g. a first green imaging element 1102, may be disposed to correspond to any one area of the first portion 991 e.g. the fourth area 995, and a second green imaging element 1103 may be disposed to correspond to the other area e.g. the second area 993. When a light is radiated from the light source 1001, the light may be reflected by the first portion 991 and the reflected light may be incident to the green imaging element 1102, 1102a, 1103, and 1103a. The light reflected by the second area 993 may be incident to the second green imaging element 1103, and the light reflected by the fourth area 995 may be incident to the first green imaging element 1102. When a light is incident, the green imaging element 1102, 1102a, 1103 may output an image signal (i2111 to i2123) corresponding to a green light among the reflected light, as illustrated in FIG. 20.

Accordingly, the image sensor 1100 may acquire the fifth image signal (i21). An image signal (i2111 to i2123) corresponding to the green light may be acquired in a position in which the green imaging element 1102, 1102a, 1103, and 1103a are placed, and an image signal corresponding to the green light may be not acquired in other position. Therefore, the fifth image signal (i21) may include approximately 50% of entire information related to the green color that is delivered from the outside to the image sensor 1100.

As illustrated in FIG. 13, when the image sensor 1100 is moved from the first position to the second position, the green imaging element 1102, 1102a, 1103, and 1103a may be moved according to the movement of the image sensor 1100, and output the image signal (i2211 to i2223) corresponding the green light in a position that is different from the first position, as illustrated in FIG. 21. Therefore, the image sensor 1100 may acquire a sixth image signal (i22) corresponding to the green light in a second position that is different from the first position. Since the green imaging element 1102, 1102a, 1103, and 1103a is moved to the upper direction by a pixel unit, the green imaging element 1102, 1102a, 1103, and 1103a may be capable of receiving a light in a position in which a green imaging element 1102, 1102a, 1103, and 1103a could not acquire a light in a conventional manner, and capable of acquiring an image signal (i2211 to i2223) in a position in which an image signal corresponding to the green light is not acquired.

The sixth image signal (i22) may include approximately 50% of entire information related to the green color that is delivered from the outside to the image sensor 1100, as mentioned above.

Figure 22:
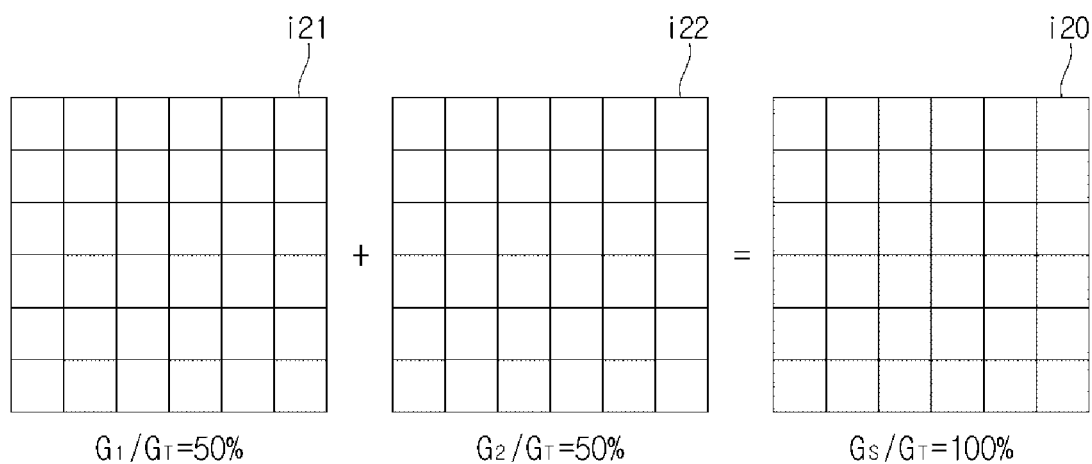
FIG. 22 is a view illustrating a combination of green image signals acquired in each position.

FIG. 22 is a view illustrating a combination of green image signals acquired in each position.

The image processor 1203 may acquire a single green color image (i20) by combining the fifth image signal (i21) and the sixth image signal (i22), as illustrated in FIG. 22. The green color image (i20) may be an image formed by information corresponding to the green light among the light transmitted from the object 990. Since the fifth image signal (i21) and the sixth image signal (i22) includes approximately 50% of entire information (G1/GT, and G2/GT), respectively, as illustrated in FIG. 22, and the image signal (i2111 to i2123, and i2211 to i2223) included in the fifth image signal (i21) and the sixth image signal (i22) are not overlapped with each other, the image processor 1203 may acquire the single green color image (i20) including entire information, which is related to the green color transmitted from the outside to the image sensor 1100, by combining the fifth image signal (i21) and the sixth image signal (i22) (GS/GT).

The green image (i20) including entire information, which is related to the green color, may be acquired by a single movement of the image sensor 1100. Since the green imaging element 1102, 1102a, 1103, and 1103a is provided in the image sensor 1100 together with the red imaging element 1101 to 1101c and the blue imaging element 1104, the green imaging element 1102, 1102a, 1103, and 1103a may output an image signal corresponding to the green light by moving by more than three times as the same as the red imaging element 1101 to 1101c and the blue imaging element 1104. The green imaging element 1102, 1102a, 1103, and 1103a may output an image signal (i301) corresponding to the same green light by a plurality of times e.g. more than two times. During an image signal (i101) corresponding to the red light and an image signal (i201) corresponding to the blue light are acquired in all over the area, the image processor 1203 may generate a green color image (i20) by using all of image signals (i301) corresponding to the green light that is acquired by a plurality of times, may generate a green color image (i20) by using an image signal that is acquired in later while ignoring an image signal that is acquired in advance, or may generate a green color image (i20) by using an image signal that is acquired in advance while ignoring an image signal that is acquired in later.

When the red color image (i10), the green color image (i20), and the blue color image are acquired, the image processor 1203 may acquire a final image (R) by overlapping and combining the red color image (i10), the green color image (i20), and the blue color image. Accordingly, it may be possible to acquire an image without the loss of color information.

Hereinbefore an example in which the image processor 1203 acquires an image (R) by individually acquiring the red color image (i10), the green color image (i20), and the blue color image, and then combining the red color image (i10), the green color image (i20), and the blue color image is described. It may not be required that the red color image (i10), the green color image (i20), and the blue color image are generated in advance.

For example, according to an embodiment, the image processor 1203 may generate a final image (R) by simultaneously combining the first image signal to the fourth image signal (i11 to i14) corresponding to the red light, the fifth image signal and the sixth image signal (i21 to i22) corresponding to the green light, and the image signal corresponding to the blue light. Alternatively, the image processor 1203 may generate a final image (R) by combining the first image signal to the fourth image signal (i11 to i14) corresponding to the red light, the fifth image signal and the sixth image signal (i21 to i22) corresponding to the green light, and the image signal corresponding to the blue light in a variety of methods.

Hereinafter according to another embodiment, an image acquisition apparatus is configured to acquire an image by controlling a plurality of light sources will be described with reference to FIGS. 23 to 29.

Figure 23:
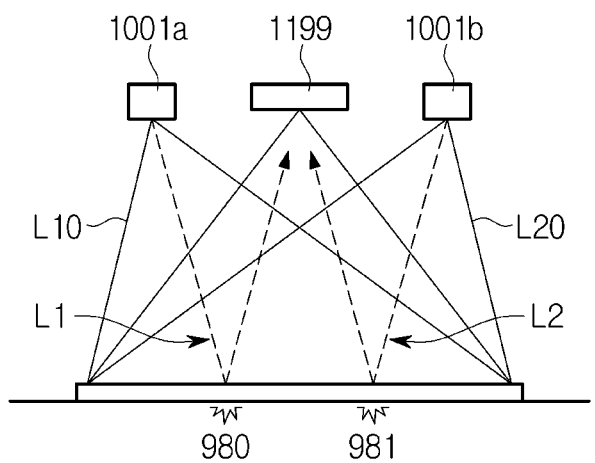
FIG. 23 is a view illustrating a state in which a light is radiated from a plurality of light sources.
Figure 24:
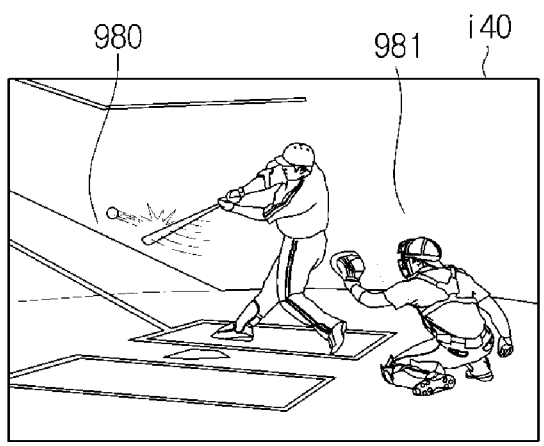
FIG. 24 is a view illustrating an image in which a glare spot is generated due to a light radiated from the plurality of light sources.

FIG. 23 is a view illustrating a state in which a light is radiated from a plurality of light sources, and FIG. 24 is a view illustrating an image in which a glare spot is generated due to a light radiated from the plurality of light sources.

In a state in which the surface of the object 990 has the characteristics of a semi-glossy or glossy, when a light (L10, L20) is irradiated from the plurality of light sources 1001a and 1001b, as illustrated in FIG. 23, the irradiated light may be specularly reflected by the surface of the object 990 and then incident to the image sensor module 1199 (L1 and L2). Since the light (L1 and L2) has relatively stronger intensity than other light, there may be a distortion 980 and 981 e.g. speckle and glare spot, in an image acquired by the image sensor module 1199, as illustrated in FIG. 24.

The image acquisition apparatus 1000 described below may remove the distortion 980 and 981 e.g. speckle and glare spot without using a complicated image processing method.

Figure 25:
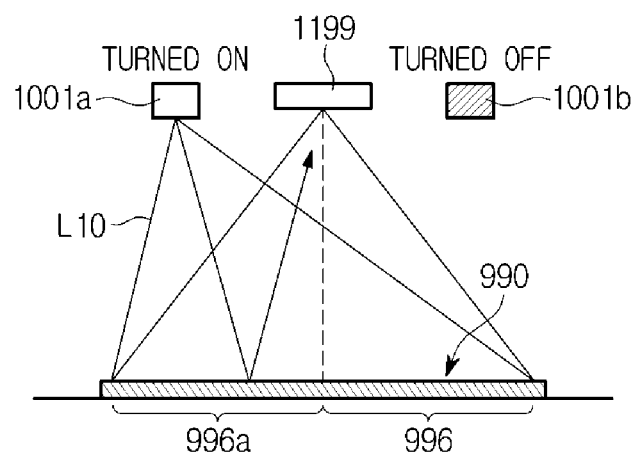
FIG. 25 is a view of an example of acquiring an image signal when a first light source is turned on and a second light source is turned off.
Figure 26:
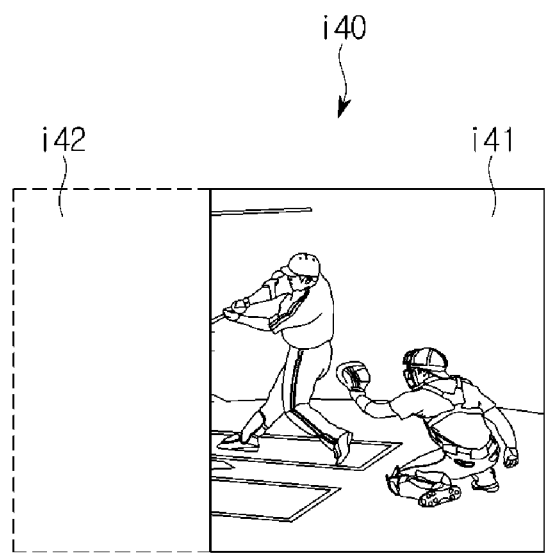
FIG. 26 is a view of an example of an image signal acquired when a first light source is turned on and a second light source is turned off.

FIG. 25 is a view of an example of acquiring an image signal when a first light source is turned on and a second light source is turned off, and FIG. 26 is a view of an example of an image signal acquired when a first light source is turned on and a second light source is turned off.

Referring to FIG. 25, when an image of the object 990 is photographed, any one of a plurality of light sources 1001, e.g. the first light source 1001a may be turned on and the other light source e.g. the second light source 1001b may be turned off. The first light source 1001a and the second light source 1001b may be turned on and off according to a control of the light source driving unit 1201. Turning on and off of the first light source 1001a and the second light source 1001b may be performed according to a certain pattern, and the first light source 1001a and the second light source 1001b may be turned on and off in order.

The first light source 1001a and the second light source 1001b may be disposed to face to each other with respect to the image sensor module 1199. The first light source 1001a may be disposed on a position corresponding to one edge or a surrounding area of the one edge of the object 990, and the second light source 1001b may be disposed on a position corresponding to the other edge or a surrounding area of the other one edge of the object 990.

When the first light source 1001a is turned on to radiate the light (L10) to the object 990, the light (L10) radiated from the first light source 1001a may be incident to all surfaces or most of the surfaces of the object 990 and then the light (L10) may be reflected by the all surfaces or most of the surfaces of the object 990 to which the light (L10) is incident. The reflected light may be transmitted to the image sensor module 1199.

According to an embodiment, the image sensor module 1199 may be operated to acquire information about the certain one portion 996 of the incident light and not to acquire information about the other portion 996a. In other words, the image sensor module 1199 may acquire information about an image of one portion i.e. information about a first portion image (i41), in the information corresponding to an entire image (i40) and ignore and discard information about the other portion (i42), as illustrated in FIG. 26. For example, when the image sensor 1100 of the image sensor module 1199 is implemented by Complementary Metal-Oxide Semiconductor (CMOS), since it is possible that the image sensor 1199 implemented by the CMOS is set to selectively acquire image information about a certain pixel that is selected in the entire pixels, information about the first portion image (i41) may be acquired, and information about the other portion (i42) may be ignored or discarded in the information corresponding to the entire image (i40) by using the image sensor 1199 implemented by the CMOS.

According to another embodiment, the image processor 1203 receiving the image signal (i) from the image sensor module 1199 may generate the first portion image (i41) by selectively acquiring only information about the image (i41) of the one portion and ignoring or discarding information about the other portion (i42) in the information corresponding to the entire image (i40). In this case, the image sensor module 1199 may be not required to acquire the information about the certain one portion 996 and not to acquire the information about the other portion 996a.

In this case, as illustrated in FIG. 25, the first portion image (i41) selected by at least one of the image sensor module 1199 and the image processor 1203 may correspond to information acquired form the one portion 996 of the object 990 placed in a lower end of the second light source 1001b. As mentioned above, in a state in which the second light source 1001b is disposed to be opposite to the first light source 1001a that is turned on with respect to the image sensor module 1199, when the one edge 996a of the object 990 is disposed on a lower end of the first light source 1001a, the selected first portion image (i41) may be an image corresponding to the other end surrounding 996 that is opposite to the one edge of the object 990. Since the light (L10) incident to the other end surrounding 996 in the opposite direction to the one edge of the object 990 has a relatively large incident angle, the reflected light may not be directly incident to the image sensor module 1199. Therefore, there may be no speckle and glare spot in a portion adjacent to the second light source 1001b e.g. one portion 996 placed in a lower end of the second light source 1001b. In addition, an image signal, which is acquired by a light reflected by a portion 996a in which the light (L10) radiated from the first light source 1001a is specualry reflected, may be not acquired or discarded by at least one of the image sensor module 1199 and the image processor 1203, as mentioned above, and thus there may be no speckle and glare spot in the first portion image (i41) generated by the image processor 1203.

Figure 27:
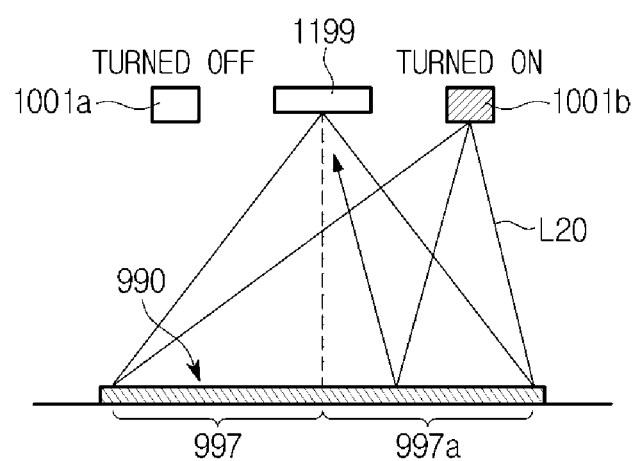
Figure 28:
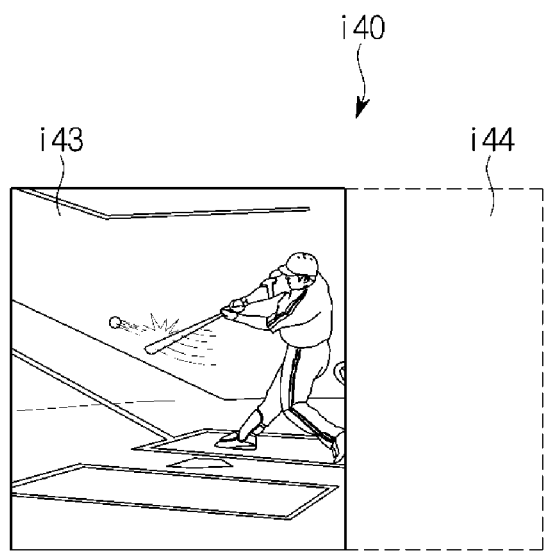

FIG. 27 is a view of an example of acquiring an image signal when a first light source is turned off and a second light source is turned on, and FIG. 28 is a view of an example of an image signal acquired when a first light source is turned off and a second light source is turned on.

As mentioned above, when an image of one portion i.e. the first portion image (i41) is generated or information about the first portion image (i41) e.g. an image signal is acquired, the first light source 1001a may be turned off and the second light source 1001b may be turned on to radiate the light (L20) to the object 990.

When the second light source 1001b is turned on to radiate the light (L20) to the object 990, the light (L20) radiated from the second light source 1001b may be incident to all surfaces or most of the surfaces of the object 990. The light (L20) may be reflected by the all surfaces or most of the surfaces of the object 990, to which the light (L20) is incident, and then transmitted to the image sensor module 1199.

According to an embodiment, the image sensor module 1199 may be operated to acquire information about a certain one portion 997 and not to acquire information about the other portion 997a in the incident light. In other words, the image sensor module 1199 may selectively acquire information about an image of one portion i.e. information about a second portion image (i43) and ignore and discard information about the other portion (i44) in the information corresponding to an entire image (i40). To selectively acquire certain information, as mentioned above, the image sensor 1100 of the image sensor module 1199 may be implemented by Complementary Metal-Oxide Semiconductor (CMOS) configured to selectively acquire image information about a certain pixel that is selected in the entire pixels.

According to another embodiment, the image processor 1203 receiving the image (i) from the image sensor module 1199 may generate an image by selectively acquiring only information about the second portion image (i43) and ignoring or discarding information about the other portion (i44) in the information corresponding to the entire image (i40).

Referring to FIG. 27, the second portion image (i43) selected by at least one of the image sensor module 1199 and the image processor 1203 may correspond to information acquired form the one portion 997 of the object 990 placed in a lower end of the first light source 1001a in contrast to as mentioned above. In a state in which the second light source 1001b is disposed to be opposite to the first light source 1001a, when the other edge 997a of the object 990 is disposed adjacent to the second light source 1001b that is turned on, an image signal about the second portion image (i43) that is selected and acquired by at least one of the image sensor module 1199 and the image processor 1203 or the second portion image (i43) may be an image existed in an edge around 997 that is opposite to the other edge of the object 990. As mentioned above, since a light that is reflected by the end surrounding 997 in the opposite direction to the other end edge may not be directly incident to the image sensor module 1199, there may be no speckle and glare spot in the one portion 997 placed in a lower end of the first light source 1001a. In addition, an image signal, which is acquired by a light reflected by a portion 997a in which the light (L20) is specualry reflected may be not acquired or discarded by at least one of the image sensor module 1199 and the image processor 1203, and thus there may be no speckle and glare spot in the second portion image (i43) generated by the image processor 1203.

Figure 29:
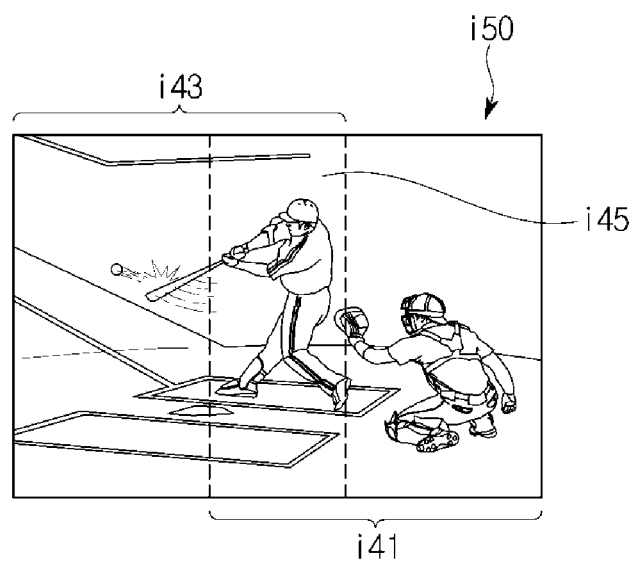
FIG. 29 is a view of an example of combing acquired image signals.

FIG. 29 is a view of an example of combing acquired image signals.

Referring to FIG. 29, the image processor 1203 may generate a final image (R) by combining the acquired two images i.e. the first portion image (i41) and the second portion image (i43).

In this case, the image processor 1203 may acquire the final image (i50) by connecting the one end edge of the first portion image (i41) to the one end edge of the second portion image (i43) corresponding to the one end edge of the first portion image (i41). The one end edge of the first portion image (i41) may include an end edge of a portion (i43) that is not acquired in end edges of the first portion image (i41), and the one end edge of the second portion image (i43) may include an end edge of a portion (i44) that is not acquired in end edges of the second portion image (i43).

If there is a portion (i45) in which the first portion image (i41) and the second portion image (i43) are overlapped, the image processor 1203 may delete an overlapped portion (i45) from the first portion image (i41) and then generate a final image (i50) by combining the first portion image (i41) in which the overlapped portion (i45) is deleted and the second portion image (i43). Alternatively, the image processor 1203 may delete the overlapped portion (i45) from the second portion image (i43) and then generate a final image (i50) by combining the second portion image (i43) in which the overlapped portion (i45) is deleted and the first portion image (i41).

In addition, if there is a portion (i45) in which the first portion image (i41) and the second portion image (i43) are overlapped, the image processor 1203 may extract a feature point and then coordinate the one portion (i45) of the first portion image (i41) and the one portion (i45) of the second portion image (i43) to combine the first portion image (i41) and the second portion image (i43) thereby generating a final image (i50). Alternatively, the image processor 1203 may combine and compose the first portion image (i41) and the second portion image (i43) to acquire a final image (i50) by using a stitching method.

The image processor 1203 may acquire a final image (i50) by combining the first portion image (i41) and the second portion image (i43) by using a variety of methods considered by a designer.

As mentioned above, since there is no speckle and glare spot in the first portion image (i41) and the second portion image (i43), there may no speckle and glare spot in the acquired image (i50). Therefore, it may be possible to effectively remove the distortion 980 and 981 e.g. a speckle and a glare spot, in the image (i40) without an additionally complicated image process.

Hereinbefore the image acquisition apparatus according to an embodiment is described, but the above-described embodiment is not only that are specific to the image acquisition device. The above-described embodiment may be applied to the image forming apparatus in the same manner or in a manner with some modifications and variations according to a designer's consideration. The image forming apparatus may include a printer, a copying machine, a facsimile, or a multi-function peripheral (MFP) in which a printer, a copying machine and a facsimile are combined. The image forming apparatus may include an image forming device by using an ink-jet method configured to print a certain image on a print medium by ejecting and radiating ink of minor liquid droplets in a desired position of the print medium, an image forming apparatus by using a transfer photography method configured to print a certain image by supplying a toner to an electrostatic latent image formed by scanning light onto a photosensitive body and then by transferring the electrostatic latent image with the toner onto the print medium.

Hereinafter various embodiments of a control method of the image acquisition apparatus will be described with reference to FIGS. 30 and 31.

Figure 30:
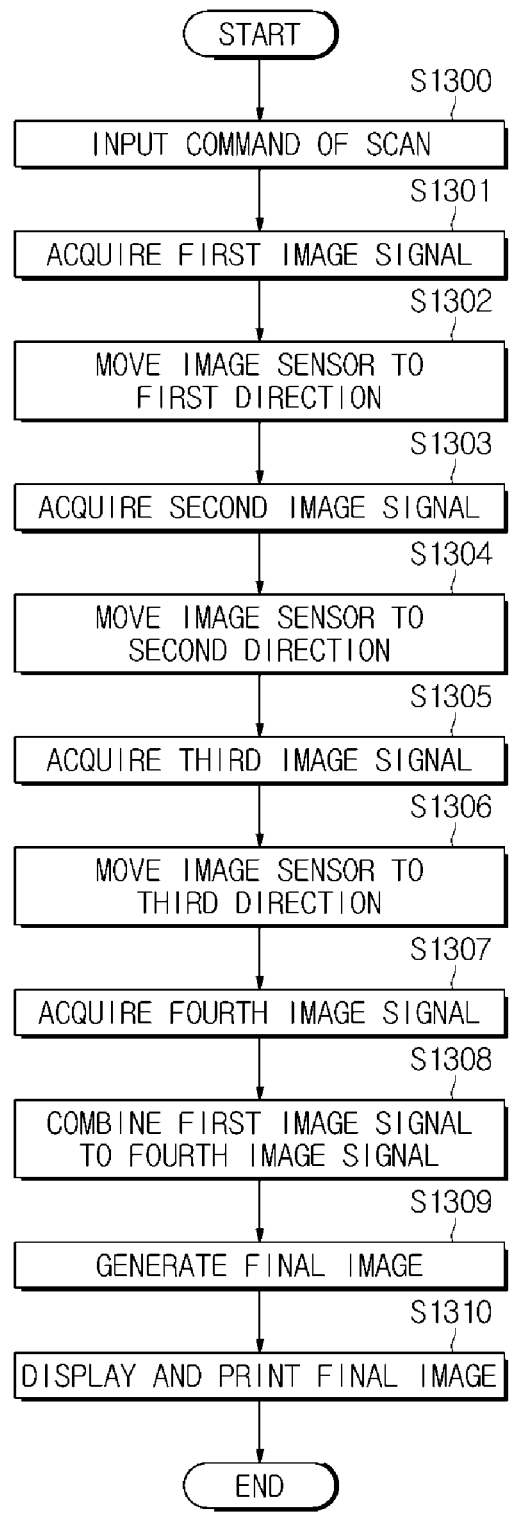
FIG. 30 is a flowchart of a control method of an image acquisition apparatus in accordance with an embodiment of the present disclosure.

FIG. 30 is a flowchart of a control method of an image acquisition apparatus in accordance with an embodiment of the present disclosure.

As illustrated in FIG. 30, a user may input a user command, e.g. a command of scanning by operating the input unit provided in the image acquisition apparatus or a computer device that is separately provided (s 1300).

The image sensor of the image acquisition apparatus may acquire the first image signal in the first position (s1301). According to an embodiment, after a light is radiated to the object from the light source, the image sensor may acquire the first image signal by receiving a light reflected from the object.

In this case, the image sensor may be formed in a way that the red imaging element, the green imaging element, and the blue imaging element are arranged in a certain pattern. The certain pattern may include a mosaic pattern. The first image signal may include an image signal corresponding to the red light, an image signal corresponding to the green light, and an image signal corresponding to the blue light, which are output from the each imaging element. When the image sensor acquires the first image signal in the first position, any one of image signal corresponding to the image signal corresponding to the red light, the image signal corresponding to the green light, and the image signal corresponding to the blue light, may be output from each pixel of the image sensor (i.e. a portion formed by one single imaging element) according to the arrangement pattern of the red imaging element, the green imaging element, and the blue imaging element.

When the first image signal is acquired, the image sensor may be moved to the first direction (s1302). The first direction may be randomly selected by a user. The image sensor may be provided to be movable by using at least one means, e.g. a rail. The image sensor may be moved to the first direction as far as a length or a width of the one imaging element, and then stopped in the second position.

When the image sensor reaches the second position after moving in the first direction, the image sensor may acquire the second image signal (s 1303). The light may be radiated to the object from the light source again, and the image sensor may acquire the second image signal by receiving a light reflected by the object.

The red imaging element, the green imaging element, and the blue imaging element may secondly output an image signal corresponding to the red light, an image signal corresponding to the green light, and an image signal corresponding to the blue light according to a received light, and thus the image sensor may acquire and output the second image signal. In this case, the image signal corresponding to the red light, the image signal corresponding to the green light, and the image signal corresponding to the blue light all of which are output when the image sensor is placed in the second position may be output in a position different from a position of the image signal corresponding to the red light, the image signal corresponding to the green light, and the image signal corresponding to the blue light all of which are output when the image sensor is placed in the first position.

When the second image signal is acquired, the image sensor may be moved to the second direction (s1304). The second direction may be randomly selected by a user, particularly the second direction may be a direction perpendicular to the first direction. The image sensor may be moved in the second direction as far as a length or a width of the one imaging element, and then stopped in the third position.

When the image sensor reaches the third position, the image sensor may acquire the third image signal (s 1305). As mentioned above, the light is radiated to the object from the light source again, and the image sensor may acquire the third image signal by receiving a light reflected by the object again.

The red imaging element, the green imaging element, and the blue imaging element may thirdly output an image signal corresponding to the red light, an image signal corresponding to the green light, and an image signal corresponding to the blue light according to a light received by the each imaging element. In this case, the image signal corresponding to the red light, the image signal corresponding to the green light, and the image signal corresponding to the blue light, all of which are output when the image sensor is placed in the third position, may be output in a position different from a position of the image signal corresponding to the red light, the image signal corresponding to the green light, and the image signal corresponding to the blue light all of which are output when the image sensor is placed in the first position, and may be output in a position different from a position of the image signal corresponding to the red light, the image signal corresponding to the green light, and the image signal corresponding to the blue light all of which are output when the image sensor is placed in the second position.

When the third image signal is acquired, the image sensor may be moved to the fourth position in the third direction (s1306). The third direction may be randomly selected by a user, particularly the third direction may be a direction opposite to the first direction and a direction perpendicular to the second direction. The image sensor may be moved in the third direction as far as a length or a width of the one imaging element, and then stopped in the fourth position.

When the image sensor reaches the fourth position, the image sensor may acquire the fourth image signal by receiving a light that is radiated from the light source to the object and then reflected by the object again (s1307).

As mentioned above, the red imaging element, the green imaging element, and the blue imaging element may fourthly output an image signal corresponding to the red light, an image signal corresponding to the green light, and an image signal corresponding to the blue light according to a received light. In this case, the image signal corresponding to the red light, the image signal corresponding to the green light, and the image signal corresponding to the blue light all of which are output when the image sensor is placed in the fourth position may be output in a position different from a position of the image signal corresponding to the red light, the image signal corresponding to the green light, and the image signal corresponding to the blue light all of which are output when the image sensor is placed in the first position to the third position.

As mentioned above, when the first image signal to the fourth image signal are acquired, the image acquisition apparatus may combine the acquired first image signal to the acquired fourth image signal (s 1308) and then generate a final image (s 1309). As mentioned above, each of the first image signal, the second image signal, the third image signal, and the fourth image signal may include an image signal that is output in a differential position and corresponds to the red light, an image signal that is output in a differential position and corresponds to the green light, and an image signal that is output in a differential position and corresponds to the blue light, and thus the image acquisition apparatus may acquire information related to all colors in the entire area to be allowed to acquire an image without the loss of information by combining the information.

When the final image is acquired, the image acquisition apparatus may temporarily or non-temporarily store the acquired final image, may provide the acquired final image to a user via the display unit, or may print the acquired final image on a print medium by using the printing unit to provide the acquired final image to the user (s 1310).

Figure 31:
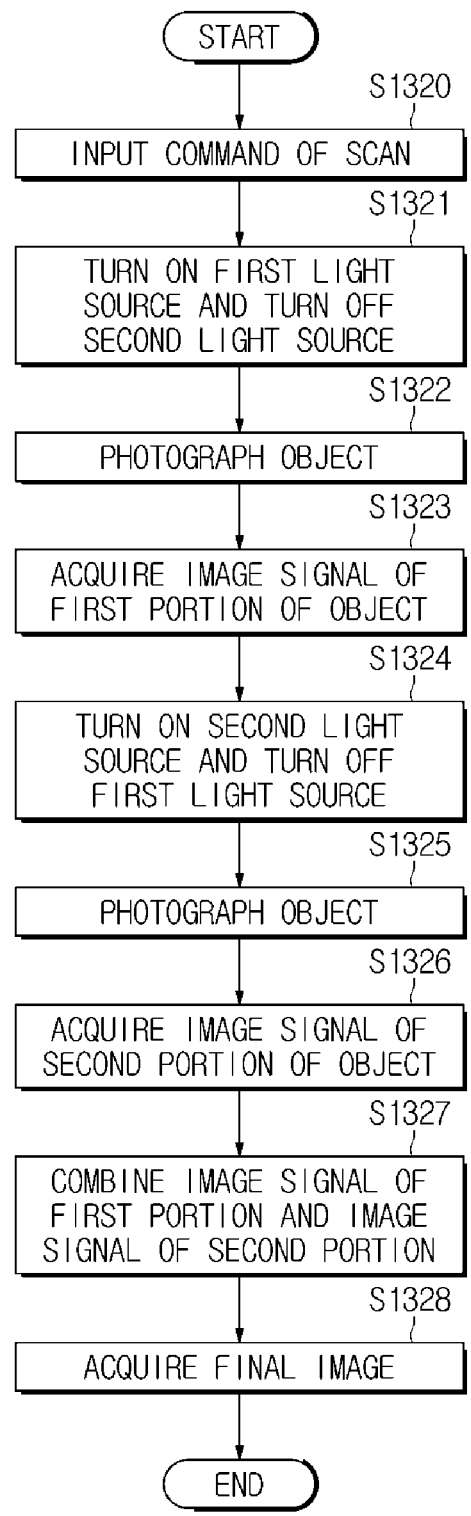
FIG. 31 is a flowchart of a control method of an image acquisition apparatus in accordance with another embodiment of the present disclosure.

FIG. 31 is a flowchart of a control method of an image acquisition apparatus in accordance with another embodiment of the present disclosure.

As illustrated in FIG. 31, a user may input a user command e.g. a command of scanning to the image acquisition apparatus by operating the input unit provided in the image acquisition apparatus in which a plurality of light sources are installed or the additional computer device that is communicable with the image acquisition apparatus (s 1320).

The image acquisition apparatus may turn on the first light source and turn off the second light source in the plurality of light sources according to a selection by a user or a designer so that only the first light source radiates a light to the object (s 1321).

The image sensor of the image acquisition apparatus may receive a light, which is radiated from the first light source and then reflected by the object, and then photograph the object by outputting an electrical signal according to the received light (s1322).

The image acquisition apparatus may acquire an image signal about the first portion that is one portion of the object according to the imaging of the object (s 1323). The first portion of the object may include one end edge of the object disposed adjacent to the second light source, and a surrounding area thereof. In this case, the image acquisition apparatus may selectively acquire an image signal of the first portion among image signals about the entire of the object according to the operation of the image sensor that uses complementary metal-oxide semiconductors (CMOS), or the image acquisition apparatus may selectively acquire an image signal of the first portion among image signals about the entire of the object according to the imaging process of the processor of the image acquisition apparatus.

When an image signal of the first portion is acquired, the first light source may be turned off and the second light source may be turned on (s1324). Accordingly, only the second light source may be allowed to radiate a light to the object.

The image sensor of the image acquisition apparatus may receive a light, which is radiated from the second light source and then reflected by the object, and then photograph the object by outputting an electrical signal according to the received light (s1325).

The image acquisition apparatus may acquire an image signal about of the second portion that is another portion of the object according to the imaging of the object (s1326). The second portion of the object may include one end edge of the object disposed adjacent to the first light source, and a surrounding area thereof. The second portion may have or may not have a portion overlapped with the first portion.

According to embodiments, the image acquisition apparatus may selectively acquire an image signal of the second portion among image signals about the entire of the object according to the operation of the image sensor that uses complementary metal-oxide semiconductors (CMOS), or the image acquisition apparatus may selectively acquire an image signal of the second portion among image signals about the entire of the object according to the imaging process of the processor of the image acquisition apparatus.

When the image signal of the first portion and the image signal of the second portion are acquired, the image acquisition apparatus may combine the image signal of the first portion and the image signal of the second portion (s1327) so as to acquire a final image (s1328).

According to an embodiment, the image acquisition apparatus may combine the image signal of the first portion and the image signal of the second portion by connecting an end edge of the image signal of the first portion to an end edge of the image signal of the second portion when there is no overlapped portion between the image signal of the first portion and the image signal of the second portion. According to another embodiment, the image acquisition apparatus may acquire a final image by coordinating and combining the image signal of the first portion and the image signal of the second portion when there is an overlapped portion between the image signal of the first portion and the image signal of the second portion. In addition, according to another embodiment, the image acquisition apparatus may acquire a final image by combining the image signal of the first portion and the image signal of the second portion by using a stitching method. In addition, the image acquisition apparatus may acquire a final image by combining the image signal of the first portion and the image signal of the second portion by using a variety of methods considered by a designer.

A control method of the image acquisition apparatus according the above-described embodiment may be implemented in the form of a program executed by a variety of computer means. The program may include program instructions, data files, and data structures as itself or a combination therewith. The program may be designed or manufactured by using higher level code executed by the computer by using an interpreter, as well as by using a machine code that is produced by a compiler. In addition, the program may be particularly designed to implement the control method of the above mentioned image acquisition apparatus or may be implemented by using various functions or definition that are well-known and available to a group of ordinary skill in the computer software field.

Programs for implementing the control method of the above-mentioned image acquisition apparatus may be recorded on a recording medium readable by a computer. The recording medium readable by a computer may include various types of hardware devices capable of storing a particular program executed in response to a call from a computer, e.g. magnetic disk storage media such as a hard disk or a floppy disk, optical media such as a magnetic tape, a compact disc (CD) or a DVD, magneto-optical media such as a floptical disk, and semiconductor memory devices such as ROM, RAM, or flash memory.

Hereinbefore a variety of embodiments of the image acquisition apparatus and the control method of the image acquisition apparatus are described, but is not limited thereto. A variety of embodiments which is implementable by those skilled in the art by correcting and modifying based on the above mentioned embodiment may correspond to the above mentioned image acquisition apparatus and the control method of the image acquisition apparatus. For example, when the above-mentioned techniques is executed in a different order from the above-mentioned method, and/or the above-mentioned components such as system, structure, device and circuit is coupled or combined in a manner different from the above-mentioned method or is replaced or substituted by other components or equivalents, the same or the similar result as the above-mentioned image acquisition apparatus and control method of the image acquisition apparatus may be achieved and those may correspond to an example of the above-mentioned image acquisition apparatus and control method of the image acquisition apparatus.

As is apparent from the above description, according to the proposed image acquisition apparatus, image forming apparatus and control method of the image acquisition apparatus, it may be possible to scan an object with high resolution and thus a high-definition image of the object may be acquired.

It may be possible to properly acquire the color information from the object and thus an image having clear color may be acquired.

When the red element, the green element, and the blue element is arranged in a mosaic pattern, the loss of the color information about the object may be reduced and thus an image having more clearness and high resolution may be acquired.

An image having high resolution may be acquired through a relative low-priced image sensor, and thus the reduction of economic cost may be achieved in the manufacture of the image acquisition apparatus and the image forming apparatus.

When acquiring an image of the object, the degradation of the image caused by a light, which is radiated from a lighting and then specularly reflected, may be prevented or it may be possible to remove a glare spot formed in a certain position in the image and thus the degradation of the image caused by the reflection of the light in the object may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image acquisition apparatus comprising:
an image sensor in which a red element outputting a signal corresponding to a red light, a green element outputting a signal corresponding to a green light, and a blue element outputting a signal corresponding to a blue light are arranged in a predetermined pattern;
a driving unit configured to move the image sensor to a plurality of positions using a plurality of rails and a plurality of wheels that are drivable on the plurality of rails, the image sensor being able to move in a straight line in four different directions using the plurality of rails and the plurality of wheels, each of the plurality of wheels being able to move in a straight line direction on a respective rail of the plurality of rails; and
an image processor configured to receive a signal output from the red element, a signal output from the green element, and a signal output from the blue element in the plurality of positions the image sensor was moved, and configured to acquire an image of an object by combining the received signals.

2. The image acquisition apparatus according to claim 1, wherein,
the driving unit moves the image sensor so that the red element is disposed to a position in which at least one of the green element and the blue element was previously disposed, the green element is disposed to a position in which at least one of the red element and the blue element was previously disposed, and the blue element is disposed to a position in which at least one of the red element and the green element was previously disposed.

3. The image acquisition apparatus according to claim 1, wherein,
the driving unit moves the image sensor so that at least one of the red element, the green element, and the blue element is disposed to a second position in which another element was previously disposed, after at least one of the red element, the green element, and the blue element outputs a first signal in a first position.

4. The image acquisition apparatus according to claim 3, wherein,
the driving unit moves the image sensor so that at least one of the red element, the green element, and the blue element is disposed to a third position in which another element was previously disposed, after at least one of the red element, the green element, and the blue element outputs a second signal in a second position.

5. The image acquisition apparatus according to claim 4, wherein,
the driving unit moves the image sensor so that at least one of the red element, the green element, and the blue element is disposed to a fourth position in which another element was previously disposed, after at least one of the red element, the green element, and the blue element outputs a third signal in a third position, wherein the at least one of the red element, the green element, and the blue element outputs a fourth signal in the fourth position.

6. The image acquisition apparatus according to claim 5, wherein the image processor combines the first signal, the second signal, the third signal and the fourth signal.

7. The image acquisition apparatus according to claim 6, wherein
the image processor combines the first signal and the second signal when the first signal and the second signal are output from the green element.

8. The image acquisition apparatus according to claim 6, wherein
the image processor acquires an image by combining the first signal to the fourth signal output from the red element, the first signal and the second signal output from the green element, and the first signal to the fourth signal output from the blue element.

9. The image acquisition apparatus according to claim 1, wherein
the driving unit moves the image sensor to a direction perpendicular to a direction in which the image sensor faces the object.

10. The image acquisition apparatus according to claim 1, wherein
the driving unit moves the image sensor to a plurality of directions, wherein at least two directions in the plurality of direction are perpendicular to each other.

11. The image acquisition apparatus according to claim 1, wherein
the predetermined pattern comprises a mosaic pattern.

12. A control method of an image acquisition apparatus comprising:
acquiring a first image signal of an object by at least one element of an image sensor of the image acquisition apparatus in a first position;
moving the image sensor to a second position using a plurality of rails and a plurality of wheels that are drivable on the plurality of rails, the second position being different than the first position, the image sensor being able to move in a straight line in four different directions using the plurality of rails and the plurality of wheels, each of the plurality of wheels being able to move in a straight line direction on a respective rail of the plurality of rails;
acquiring a second image signal of the object by at least one element of the image sensor in the second position; and
acquiring an image of the object by combining the acquired first image signal and the acquired second image signal.

13. The control method according to claim 12, wherein
the at least one element comprises at least one of a red element outputting a signal corresponding to a red light, a green element outputting a signal corresponding to a green light, and a blue element outputting a signal corresponding to a blue light.

14. An image acquisition apparatus comprising:
an image sensor in which a red element outputting a signal corresponding to a red light, a green element outputting a signal corresponding to a green light, and a blue element outputting a signal corresponding to a blue light are arranged in a predetermined pattern;
a driving unit configured to move the image sensor to a plurality of positions using a plurality of rails and a plurality of wheels that are drivable on the plurality of rails, the image sensor being able to move in a straight line in four different directions using the plurality of rails and the plurality of wheels, each of the plurality of wheels being able to move in a straight line direction on a respective rail of the plurality of rails;
an image processor configured to receive a signal output from the red element, a signal output from the green element and a signal output from the blue element in the plurality of positions the image sensor was moved, and configured to acquire an image of an object by combining the received signals; and
a printing unit configured to print the acquired image on a printing medium.

* * * * *